(12) United States Patent
Moraleda et al.

(10) Patent No.: US 9,972,108 B2
(45) Date of Patent: May 15, 2018

(54) MIXED MEDIA REALITY RECOGNITION WITH IMAGE TRACKING

(71) Applicants: Jorge Moraleda, Menlo Park, CA (US); Berna Erol, San Jose, CA (US); Jonathan J. Hull, San Carlos, CA (US)

(72) Inventors: Jorge Moraleda, Menlo Park, CA (US); Berna Erol, San Jose, CA (US); Jonathan J. Hull, San Carlos, CA (US)

(73) Assignee: Ricoh Co., Ltd., Tokyo (JP)

( * ) Notice: Subject to any disclaimer, the term of this patent is extended or adjusted under 35 U.S.C. 154(b) by 19 days.

(21) Appl. No.: 14/746,669

(22) Filed: Jun. 22, 2015

(65) Prior Publication Data

US 2015/0287228 A1  Oct. 8, 2015

Related U.S. Application Data

(60) Division of application No. 12/247,205, filed on Oct. 7, 2008, now Pat. No. 9,063,952, which is a
(Continued)

(51) Int. Cl.
*G06F 17/30* (2006.01)
*G06T 11/60* (2006.01)
(Continued)

(52) U.S. Cl.
CPC ........ *G06T 11/60* (2013.01); *G06F 17/30247* (2013.01); *G06F 17/30256* (2013.01); *G06K 9/00463* (2013.01); *G06K 9/228* (2013.01); *G06K 9/32* (2013.01); *G06K 9/6288* (2013.01); *G06T 3/4053* (2013.01); *G06K 2009/2045* (2013.01)

(58) Field of Classification Search
CPC ................. G06F 17/30247; G06F 17/30256
USPC ........ 382/116, 124, 165, 182, 181; 707/915, 707/913, 914
See application file for complete search history.

(56) References Cited

U.S. PATENT DOCUMENTS 5,598,557 A  1/1997  Doner et al.
6,067,369 A  5/2000  Kamei
(Continued)

OTHER PUBLICATIONS

Notice of Allowance for U.S. Appl. No. 12/247,205, dated Apr. 8, 2015, 15 pages.
(Continued)

*Primary Examiner* — Robert Beausoliel, Jr.
*Assistant Examiner* — Alexandria Bromell
(74) *Attorney, Agent, or Firm* — Patent Law Works LLP

(57) ABSTRACT

An MMR system integrating image tracking and recognition comprises a plurality of mobile devices, a pre-processing server or MMR gateway, and an MMR matching unit, and may include an MMR publisher. The MMR matching unit receives an image query from the pre-processing server or MMR gateway and sends it to one or more of the recognition units to identify a recognition result. Image tracking information also is provided for determining relative locations of images to each other. The mobile device includes an image tracker for providing at least a portion of the image tracking information. The disclosure also includes methods for image tracking-assisted recognition, recognition of multiple images using a single image query, and improved image tracking using MMR recognition.

16 Claims, 25 Drawing Sheets

Related U.S. Application Data continuation-in-part of application No. 12/210,511, filed on Sep. 15, 2008, now Pat. No. 8,825,682, and a continuation-in-part of application No. 12/210,519, filed on Sep. 15, 2008, now Pat. No. 8,510,283, and a continuation-in-part of application No. 12/210,532, filed on Sep. 15, 2008, now Pat. No. 8,868,555, and a continuation-in-part of application No. 12/210,540, filed on Sep. 15, 2008, now Pat. No. 8,856,108, which is a continuation-in-part of application No. 11/461,109, filed on Jul. 31, 2006, now Pat. No. 9,384,619, said application No. 12/210,511 is a continuation of application No. 12/060,194, filed on Mar. 31, 2008, now Pat. No. 8,156,115, and a continuation-in-part of application No. 12/060,198, filed on Mar. 31, 2008, now Pat. No. 9,530,050, and a continuation-in-part of application No. 12/060,200, filed on Mar. 31, 2008, now Pat. No. 8,989,431, and a continuation-in-part of application No. 12/060,206, filed on Mar. 31, 2008, and a continuation-in-part of application No. 11/461,268, filed on Jul. 31, 2006, now Pat. No. 7,639,387, and a continuation-in-part of application No. 11/461,272, filed on Jul. 31, 2006, now Pat. No. 8,005,831, and a continuation-in-part of application No. 11/461,024, filed on Jul. 31, 2006, now Pat. No. 7,991,778, and a continuation-in-part of application No. 11/461,085, filed on Jul. 31, 2006, now Pat. No. 8,949,287, and a continuation-in-part of application No. 11/466,414, filed on Aug. 22, 2006, now Pat. No. 7,587,412, and a continuation-in-part of application No. 12/059,583, filed on Mar. 31, 2008, now Pat. No. 9,373,029, and a continuation-in-part of application No. 11/624,466, filed on Jan. 18, 2007, now Pat. No. 7,970,171, and a continuation-in-part of application No. 11/777,142, filed on Jul. 12, 2007, now Pat. No. 8,176,054, and a continuation-in-part of application No. 11/776,510, filed on Jul. 11, 2007, now Pat. No. 8,086,038, and a continuation-in-part of application No. 11/776,520, filed on Jul. 11, 2007, now Pat. No. 8,144,921, and a continuation-in-part of application No. 11/776,530, filed on Jul. 11, 2007, now Pat. No. 8,184,155, and a continuation-in-part of application No. 11/827,530, filed on Jul. 11, 2007, now Pat. No. 8,276,088, and a continuation-in-part of application No. 12/121,275, filed on May 15, 2008, now Pat. No. 8,385,589, and a continuation-in-part of application No. 11/461,017, filed on Jul. 31, 2006, now Pat. No. 7,702,673, and a continuation-in-part of application No. 11/461,294, filed on Jul. 31, 2006, now Pat. No. 8,332,401, and a continuation-in-part of application No. 11/461,300, filed on Jul. 31, 2006, now Pat. No. 8,521,737, and a continuation-in-part of application No. 11/461,286, filed on Jul. 31, 2006, now Pat. No. 8,335,789, and a continuation-in-part of application No. 11/461,279, filed on Jul. 31, 2006, now Pat. No. 8,600,989, and a continuation-in-part of application No. 11/461,091, filed on Jul. 31, 2006, now Pat. No. 7,885,955, and a continuation-in-part of application No. 11/461,126, filed on Jul. 31, 2006, now Pat. No. 8,195,659, and a continuation-in-part of application No. 11/461,049, filed on Jul. 31, 2006, now Pat. No. 7,920,759, and a continuation-in-part of application No. 11/461,095, filed on Jul. 31, 2006, now Pat. No. 7,917,554, and a continuation-in-part of application No. 11/461,143, filed on Jul. 31, 2006, now Pat. No. 8,156,427, and a continuation-in-part of application No. 11/461,064, filed on Jul. 31, 2006, now Pat. No. 7,669,148, and a continuation-in-part of application No. 11/461,075, filed on Jul. 31, 2006, now Pat. No. 7,812,986, and a continuation-in-part of application No. 11/461,090, filed on Jul. 31, 2006, now Pat. No. 7,551,780, and a continuation-in-part of application No. 11/461,037, filed on Jul. 31, 2006, now Pat. No. 8,838,591, and a continuation-in-part of application No. 11/461,147, filed on Jul. 31, 2006, now Pat. No. 9,171,202, and a continuation-in-part of application No. 11/461,164, filed on Jul. 31, 2006, now Pat. No. 9,405,751, and a continuation-in-part of application No. 11/461,032, filed on Jul. 31, 2006, now Pat. No. 7,672,543.

(51) Int. Cl.
| | |
|---|---|
| *G06K 9/00* | (2006.01) |
| *G06K 9/22* | (2006.01) |
| *G06K 9/32* | (2006.01) |
| *G06K 9/62* | (2006.01) |
| *G06T 3/40* | (2006.01) |
| G06K 9/20 | (2006.01) |

(56) References Cited

U.S. PATENT DOCUMENTS

| | | | |
|---|---|---|---|
| 6,345,109 B1 | 2/2002 | Souma | |
| 6,430,307 B1 | 8/2002 | Souma | |
| 6,438,071 B1* | 8/2002 | Hansen | G01S 15/89 367/88 |
| 6,470,094 B1 | 10/2002 | Lienhart et al. | |
| 6,625,311 B1 | 9/2003 | Zhu | |
| 6,640,000 B1* | 10/2003 | Fey | C07K 14/47 382/128 |
| 6,678,698 B2 | 1/2004 | Fredell et al. | |
| 6,781,694 B2 | 8/2004 | Nahum et al. | |
| 6,874,420 B2 | 4/2005 | Lewis et al. | |
| 6,882,741 B2 | 4/2005 | Dobashi | |
| 6,981,224 B1 | 12/2005 | Gardner | |
| 7,013,289 B2 | 3/2006 | Horn | |
| 7,340,080 B2* | 3/2008 | Liu | G06K 9/001 382/124 |
| 7,362,323 B2 | 4/2008 | Doyle | |
| 7,441,276 B2* | 10/2008 | Ueda | G06F 21/10 726/26 |
| 7,463,790 B2 | 12/2008 | Shepherd | |
| 7,466,875 B1 | 12/2008 | Siegel | |
| 7,593,961 B2 | 9/2009 | Egucki et al. | |
| 7,599,844 B2 | 10/2009 | King | |
| 7,620,254 B2 | 11/2009 | Hahn et al. | |
| 7,765,231 B2 | 7/2010 | Rathus et al. | |
| 7,787,655 B1 | 8/2010 | Cohen | |
| 7,860,276 B2* | 12/2010 | Anai | G06T 7/33 382/107 |
| 7,930,292 B2 | 4/2011 | Nakajima | |
| 7,986,343 B2* | 7/2011 | Kumagai | H04N 5/2254 348/208.1 |
| 8,036,441 B2 | 10/2011 | Frank et al. | |
| 8,156,116 B2 | 4/2012 | Graham et al. | |
| 8,212,832 B2 | 7/2012 | Stefanidis | |
| 8,904,270 B2 | 12/2014 | Bouchard | |
| 9,020,966 B2 | 4/2015 | Erol et al. | |
| 9,058,331 B2 | 6/2015 | Graham et al. | |
| 9,063,952 B2 | 6/2015 | Moraleda et al. | |
| 9,063,953 B2 | 6/2015 | Hull et al. | |
| 9,087,104 B2 | 7/2015 | Graham et al. | |
| 9,092,423 B2 | 7/2015 | Moraleda | |
| 9,171,202 B2 | 10/2015 | Hull et al. | |
| 9,176,984 B2 | 11/2015 | Hull et al. | |
| 9,311,336 B2 | 4/2016 | Hull et al. | |
| 9,357,098 B2 | 5/2016 | Graham | |
| 9,373,029 B2 | 6/2016 | Hull et al. | |
| 9,384,619 B2 | 7/2016 | Erol et al. | |

(56) References Cited

U.S. PATENT DOCUMENTS

| | | | |
|---|---|---|---|
| 9,405,751 B2 | 8/2016 | Hull et al. | |
| 9,495,385 B2 | 11/2016 | Moraleda et al. | |
| 9,530,050 B1 | 12/2016 | Erol et al. | |
| 9,870,388 B2 | 1/2018 | Erol et al. | |
| 2001/0019636 A1 | 9/2001 | Slatter | |
| 2001/0037454 A1 | 11/2001 | Botti et al. | |
| 2002/0018589 A1* | 2/2002 | Beuker | A61B 6/5241 382/132 |
| 2002/0032677 A1 | 3/2002 | Morgenthaler et al. | |
| 2002/0057849 A1* | 5/2002 | Senda | G06T 5/50 382/284 |
| 2002/0078043 A1 | 6/2002 | Pass et al. | |
| 2002/0107755 A1 | 8/2002 | Steed et al. | |
| 2002/0129363 A1 | 9/2002 | McGuire | |
| 2002/0145746 A1 | 10/2002 | Mortenson et al. | |
| 2002/0161673 A1 | 10/2002 | Lee | |
| 2003/0009495 A1 | 1/2003 | Adjaoute | |
| 2003/0026457 A1 | 2/2003 | Nahum | |
| 2003/0063673 A1 | 4/2003 | Riemens et al. | |
| 2003/0073922 A1 | 4/2003 | Miller | |
| 2003/0115481 A1 | 6/2003 | Baird et al. | |
| 2003/0151679 A1* | 8/2003 | Amerson | H04N 5/23212 348/231.6 |
| 2003/0154180 A1 | 8/2003 | Case et al. | |
| 2003/0169922 A1 | 9/2003 | Kamon | |
| 2003/0223623 A1* | 12/2003 | Gutta | G06K 9/00268 382/118 |
| 2003/0231806 A1* | 12/2003 | Troyanker | G06F 17/30256 382/305 |
| 2004/0013302 A1 | 1/2004 | Ma | |
| 2004/0047499 A1 | 3/2004 | Shams | |
| 2004/0073708 A1 | 4/2004 | Warnock | |
| 2004/0107256 A1 | 6/2004 | Odenwald et al. | |
| 2004/0190791 A1 | 9/2004 | Oyabu et al. | |
| 2004/0198396 A1 | 10/2004 | Fransioli | |
| 2004/0218099 A1* | 11/2004 | Washington | H04N 5/77 348/571 |
| 2004/0249795 A1 | 12/2004 | Brockway et al. | |
| 2005/0047631 A1* | 3/2005 | Zyzdryn | G06K 9/00026 382/124 |
| 2005/0069291 A1 | 3/2005 | Voss et al. | |
| 2005/0111738 A1 | 5/2005 | Iizuka | |
| 2005/0169511 A1 | 8/2005 | Jones | |
| 2005/0190273 A1 | 9/2005 | Toyama et al. | |
| 2005/0197869 A1 | 9/2005 | Schaefer et al. | |
| 2005/0244059 A1 | 11/2005 | Turski | |
| 2005/0259866 A1 | 11/2005 | Jacobs et al. | |
| 2005/0262240 A1 | 11/2005 | Drees | |
| 2005/0267872 A1 | 12/2005 | Galai et al. | |
| 2006/0026140 A1 | 2/2006 | King | |
| 2006/0079214 A1 | 4/2006 | Mertama et al. | |
| 2006/0087709 A1* | 4/2006 | Ikegawa | H04N 1/32128 358/540 |
| 2006/0150079 A1 | 7/2006 | Albornoz et al. | |
| 2006/0173560 A1 | 8/2006 | Widrow | |
| 2006/0203010 A1* | 9/2006 | Kirchner | G09G 3/003 345/629 |
| 2006/0282312 A1 | 12/2006 | Carlson et al. | |
| 2007/0031063 A1* | 2/2007 | Zhou | G06K 9/32 382/284 |
| 2007/0050175 A1 | 3/2007 | Schmelzer et al. | |
| 2007/0052803 A1* | 3/2007 | Chosak | G06K 9/00771 348/143 |
| 2007/0088687 A1 | 4/2007 | Bromm et al. | |
| 2007/0115384 A1 | 5/2007 | Furukawa | |
| 2007/0154096 A1* | 7/2007 | Cao | G06K 9/00234 382/190 |
| 2007/0242138 A1* | 10/2007 | Manico | G06F 17/30265 348/231.3 |
| 2007/0260597 A1 | 11/2007 | Cramer | |
| 2008/0009707 A1* | 1/2008 | Theriault | A61B 5/055 600/410 |
| 2008/0039052 A1 | 2/2008 | Knowles | |
| 2008/0120321 A1 | 5/2008 | Liu | |
| 2008/0141117 A1 | 6/2008 | King et al. | |
| 2008/0172422 A1 | 7/2008 | Li et al. | |
| 2008/0317383 A1 | 12/2008 | Franz et al. | |
| 2008/0319844 A1 | 12/2008 | Hua et al. | |
| 2009/0248665 A1 | 10/2009 | Garg et al. | |
| 2009/0319894 A1 | 12/2009 | Markiewicz et al. | |
| 2010/0085383 A1 | 4/2010 | Cohen et al. | |
| 2010/0239175 A1 | 9/2010 | Bober et al. | |
| 2010/0278453 A1 | 11/2010 | King | |
| 2011/0093492 A1 | 4/2011 | Sull et al. | |
| 2011/0125727 A1 | 5/2011 | Zou et al. | |
| 2011/0276874 A1 | 11/2011 | Déjean | |
| 2015/0139540 A1 | 5/2015 | Moraleda et al. | |
| 2015/0324848 A1 | 11/2015 | Graham et al. | |
| 2015/0350151 A1 | 12/2015 | Graham et al. | |

OTHER PUBLICATIONS

Non-Final Office Action for U.S. Appl. No. 13/330,492, dated Apr. 8, 2015, 19 pages.
Notice of Allowance for U.S. Appl. No. 12/719,437, dated Apr. 10, 2015, 16 pages.
Notice of Allowance for U.S. Appl. No. 13/933,078, dated May 16, 2015, 7 pages.
Non-Final Office Action for U.S. Appl. No. 11/461,109, dated Jun. 15, 2015, 18 pages.
Non-Final Office Action for U.S. Appl. No. 11/461,164, dated Jun. 30, 2015, 20 pages.
Non-Final Office Action for U.S. Appl. No. 14/604,619, dated Oct. 7, 2015, Moraleda et al., 9 pages.
Final Office Action for U.S. Appl. No. 13/330,492, dated Oct. 8, 2015, Graham et al., 20 pages.
Final Office Action for U.S. Appl. No. 12/060,198, dated Oct. 8, 2015, Erol et al., 32 pages.
Non-Final Office Action for U.S. Appl. No. 13/914,417, dated Oct. 14, 2015, Erol et al., 18 pages.
Final Office Action for U.S. Appl. No. 11/461,109, dated Nov. 10, 2015, Erol et al., 21 pages.
Final Office Action for U.S. Appl. No. 11/461,164, dated Nov. 27, 2015, Hull et al., 20 pages.
Notice of Allowance for U.S. Appl. No. 12/059,583, dated Jan. 15, 2016, Hull et al., 9 pages.
Notice of Allowance for U.S. Appl. No. 13/330,492, dated Jan. 26, 2016, Graham et al., 8 pages.
Final Office Action for U.S. Appl. No. 12/060,206, dated Feb. 1, 2016, Erol et al., 26 pages.
Notice of Allowance for U.S. Appl. No. 13/494,008, dated Feb. 16, 2016, Hull et al., 15 pages.
Notice of Allowance for U.S. Appl. No. 14/604,619, dated Feb. 18, 2016, Moraleda et al., 8 pages.
Notice of Allowance for U.S. Appl. No. 11/461,109, dated Feb. 29, 2016, Erol et al., 9 pages.
Notice of Allowance for U.S. Appl. No. 11/461,164, dated Mar. 29, 2016, Hull et al., 8 pages.
Non-Final Office Action for U.S. Appl. No. 12/060,198, dated Apr. 8, 2016, Erol et al. 35 pages.
Final Office Action for U.S. Appl. No. 13/914,417, dated May 6, 2016, 19 pages.
Non-Final Office Action for U.S. Appl. No. 14/733,792, dated Aug. 10, 2016, 11 pages.
Non-Final Office Action for U.S. Appl. No. 14/804,241, dated Sep. 19, 2016, 32 pages.
Non-Final Office Action for U.S. Appl. No. 12/060,206, dated Nov. 2, 2016, 20 pages.
Notice of Allowance for U.S. Appl. No. 12/060,198 dated Aug. 11, 2016, 7 pages.
Non-Final Office Action for U.S. Appl. No. 12/059,583, dated Jul. 2, 2015, Jonathan J. Hull, 29 pages.
Non-Final Office Action for U.S. Appl. No. 12/060,206, dated Jul. 23, 2015, Berna Erol et al., 23 pages.
Non-Final Office Action for U.S. Appl. No. 13/494,008, dated Aug. 13, 2015, Jonathan J. Hull et al., 21 pages.

(56) References Cited

OTHER PUBLICATIONS

Non-Final Office Action for U.S. Appl. No. 14/746,663, dated Mar. 27, 2017, 27 pages.
Notice of Allowance for U.S. Appl. No. 14/733,792, dated May 3, 2017, 5 pages.
Final Office Action for U.S. Appl. No. 14/804,241, dated May 3, 2017, 10 pages.
Final Office Action for U.S. Appl. No. 12/060,206, dated May 12, 2017, 21 pages.
Non-Final Office Action for U.S. Appl. No. 13/914,417 dated Jan. 12, 2017, 21 pages.
Final Office Action for U.S. Appl. No. 14/733,792 dated Jan. 26, 2017, 7 pages.
Non-Final Office Action for U.S. Appl. No. 14/804,241, dated Aug. 10, 2017, 10 pages.
Notice of Allowance for U.S. Appl. No. 13/914,417, dated Sep. 5, 2017, 8 pages.
Final Office Action issued in U.S. Appl. No. 14/804,241, dated Nov. 30, 2017 (12 pages).
Notice of Allowance issued in U.S. Appl. No. 14/804,241, dated Jan. 16, 2018 (8 pages).
Final Office Action ssued in U.S. Appl. No. 14/746,663, dated Oct. 19, 2017 (24 pages).
Office Action from U.S. Appl. No. 12/060,206, dated Mar. 2, 2018, 32 pages.
Office Action from U.S. Appl. No. 15,701,295, dated Mar. 22, 2018, 18 pages.

\* cited by examiner

FROM FIG. 12A

MIXED MEDIA REALITY RECOGNITION WITH IMAGE TRACKING

CROSS REFERENCE TO RELATED APPLICATIONS

This application is a division of U.S. patent application Ser. No. 12/247,205, titled "Mixed Media Reality Recognition with Image Tracking," filed Oct. 7, 2008 which is a continuation in part of U.S. patent application Ser. No. 11/461,017, titled "System And Methods For Creation And Use Of A Mixed Media Environment," filed Jul. 31, 2006; U.S. patent application Ser. No. 11/461,279, titled "Method And System For Image Matching In A Mixed Media Environment," filed Jul. 31, 2006; U.S. patent application Ser. No. 11/461,286, titled "Method And System For Document Fingerprinting Matching In A Mixed Media Environment," filed Jul. 31, 2006; U.S. patent application Ser. No. 11/461,294, titled "Method And System For Position-Based Image Matching In A Mixed Media Environment," filed Jul. 31, 2006; U.S. patent application Ser. No. 11/461,300, titled "Method And System For Multi-Tier Image Matching In A Mixed Media Environment," filed Jul. 31, 2006; U.S. patent application Ser. No. 11/461,126, titled "Integration And Use Of Mixed Media Documents," filed Jul. 31, 2006; U.S. patent application Ser. No. 11/461,143, titled "User Interface For Mixed Media Reality," filed Jul. 31, 2006; U.S. patent application Ser. No. 11/461,268, titled "Authoring Tools Using A Mixed Media Environment," filed Jul. 31, 2006; U.S. patent application Ser. No. 11/461,272, titled "System And Methods For Creation And Use Of A Mixed Media Environment With Geographic Location Information," filed Jul. 31, 2006; U.S. patent application Ser. No. 11/461,064, titled "System And Methods For Portable Device For Mixed Media System," filed Jul. 31, 2006; U.S. patent application Ser. No. 11/461,075, titled "System And Methods For Use Of Voice Mail And Email In A Mixed Media Environment," filed Jul. 31, 2006; U.S. patent application Ser. No. 11/461,090, titled "System And Method For Using Individualized Mixed Document," filed Jul. 31, 2006; U.S. patent application Ser. No. 11/461,037, titled "Embedding Hot Spots In Electronic Documents," filed Jul. 31, 2006; U.S. patent application Ser. No. 11/461,085, titled "Embedding Hot Spots In Imaged Documents," filed Jul. 31, 2006; U.S. patent application Ser. No. 11/461,091, titled "Shared Document Annotation," filed Jul. 31, 2006; U.S. patent application Ser. No. 11/461,095, titled "Visibly-Perceptible Hot Spots In Documents," filed Jul. 31, 2006; U.S. patent application Ser. No. 11/466,414, titled "Mixed Media Reality Brokerage Network and Methods of Use," filed Aug. 22, 2006; U.S. patent application Ser. No. 11/461,147, titled "Data Organization and Access for Mixed Media Document System," filed Jul. 31, 2006; U.S. patent application Ser. No. 11/461,164, titled "Database for Mixed Media Document System," filed Jul. 31, 2006; U.S. patent application Ser. No. 11/461,024, titled "Triggering Actions With Captured Input In A Mixed Media Environment," filed Jul. 31, 2006; U.S. patent application Ser. No. 11/461,032, titled "Triggering Applications Based On A Captured Text In A Mixed Media Environment," filed Jul. 31, 2006; U.S. patent application Ser. No. 11/461,049, titled "Triggering Applications For Distributed Action Execution And Use Of Mixed Media Recognition As A Control Input," filed Jul. 31, 2006; U.S. patent application Ser. No. 11/461,109, titled "Searching Media Content For Objects Specified Using Identifiers," filed Jul. 31, 2006; U.S. patent application Ser. No. 11/827,530, titled "User Interface For Three-Dimensional Navigation," filed Jul. 11, 2007; U.S. patent application Ser. No. 12/060,194, titled "Document-Based Networking With Mixed Media Reality," filed Mar. 31, 2008; U.S. patent application Ser. No. 12/059,583, titled "Invisible Junction Feature Recognition For Document Security Or Annotation," filed Mar. 31, 2008; U.S. patent application Ser. No. 12/060,198, titled "Document Annotation Sharing," filed Mar. 31, 2008; U.S. patent application Ser. No. 12/060,200, titled "Ad Hoc Paper-Based Networking With Mixed Media Reality," filed Mar. 31, 2008; U.S. patent application Ser. No. 12/060,206, titled "Indexed Document Modification Sharing With Mixed Media Reality," filed Mar. 31, 2008; U.S. patent application Ser. No. 12/121,275, titled "Web-Based Content Detection In Images, Extraction And Recognition," filed May 15, 2008; U.S. patent application Ser. No. 11/776,510, titled "Invisible Junction Features For Patch Recognition," filed Jul. 11, 2007; U.S. patent application Ser. No. 11/776,520, titled "Information Retrieval Using Invisible Junctions and Geometric Constraints," filed Jul. 11, 2007; U.S. patent application Ser. No. 11/776,530, titled "Recognition And Tracking Using Invisible Junctions," filed Jul. 11, 2007; U.S. patent application Ser. No. 11/777,142, titled "Retrieving Documents By Converting Them to Synthetic Text," filed Jul. 12, 2007; U.S. patent application Ser. No. 11/624,466, titled "Synthetic Image and Video Generation from Ground Truth Data," filed Jan. 18, 2007; U.S. patent application Ser. No. 12/210,511, titled "Architecture For Mixed Media Reality Retrieval Of Locations And Registration Of Images," filed Sep. 15, 2008; U.S. patent application Ser. No. 12/210,519, titled "Automatic Adaption Of An Image Recognition System To Image Capture Devices," filed Sep. 15, 2008; U.S. patent application Ser. No. 12/210,532, titled "Computation Of A Recognizability Score (Quality Predictor) For Image Retrieval," filed Sep. 15, 2008; U.S. patent application Ser. No. 12/210,540, titled "Combining Results Of Image Retrieval Processes" filed Sep. 15, 2008; and is related to U.S. patent application Ser. No. 12/240,596, titled "Multiple Index Mixed Media Reality Recognition Using Unequal Priority Indexes," filed Sep. 29, 2008; all of which are incorporated by reference herein in their entirety.

FIELD OF THE INVENTION

The techniques disclosed here relate to indexing and searching for mixed media documents formed from at least two media types, and more particularly, to recognizing images and other data using multiple-index Mixed Media Reality (MMR) recognition that uses printed media in combination with electronic media to retrieve mixed media documents.

BACKGROUND

Document printing and copying technology has been used for many years in many contexts. By way of example, printers and copiers are used in commercial office environments, in home environments with personal computers, and in document printing and publishing service environments. However, printing and copying technology has not been thought of previously as a means to bridge the gap between static printed media (i.e., paper documents), and the "virtual world" of interactivity that includes the likes of digital communication, networking, information provision, advertising, entertainment and electronic commerce.

Printed media has been the primary source of communicating information, such as news papers and advertising information, for centuries. The advent and ever-increasing popularity of personal computers and personal electronic devices, such as personal digital assistant (PDA) devices and cellular telephones (e.g., cellular camera phones), over the past few years has expanded the concept of printed media by making it available in an electronically readable and searchable form and by introducing interactive multimedia capabilities, which are unparalleled by traditional printed media.

Unfortunately, a gap exists between the electronic multimedia-based world that is accessible electronically and the physical world of print media. For example, although almost everyone in the developed world has access to printed media and to electronic information on a daily basis, users of printed media and of personal electronic devices do not possess the tools and technology required to form a link between the two (i.e., for facilitating a mixed media document).

Moreover, there are particular advantageous attributes that conventional printed media provides such as tactile feel, no power requirements, and permanency for organization and storage, which are not provided with virtual or digital media. Likewise, there are particular advantageous attributes that conventional digital media provides such as portability (e.g., carried in storage of cell phone or laptop) and ease of transmission (e.g., email).

One particular problem in the prior is that the image recognition process is computationally very expensive and can require seconds if not minutes to accurately recognize the page and location of a pristine document from an input query image. This can especially be a problem with a large data set, for example, millions of pages of documents, or for mobile devices with a large latency or limited bandwidth connection to an MMR server. Thus, there is a need for mechanisms to improve the speed in which recognition can be performed.

The process of image tracking, or finding relative correspondence between multiple images of the same object taken from different camera positions and possibly under different illuminations, is known in the art. Basic image tracking can find corresponding points in two images, and advanced tracking can use this information to determine camera position and movement. However, to date, image tracking has not been used to improve speed and accuracy in document recognition.

SUMMARY

The techniques disclosed here overcome the deficiencies of the prior art with an MMR system combined with image tracking functionality. The system is particularly advantageous because it provides faster and/or more accurate search results. The system is also advantageous because its unique architecture can be easily adapted and updated.

In one embodiment, the MMR system comprises a plurality of mobile devices, a computer, a pre-processing server or MMR gateway, and an MMR matching unit. Some embodiments also include an MMR publisher. The mobile devices are communicatively coupled to the pre-processing server or MMR gateway to send retrieval requests including image queries and other contextual information. The pre-processing server or MMR gateway processes the retrieval request and generates an image query that is passed on to the MMR matching unit. Image tracking information is also provided prior to recognition, e.g., by an image tracker on the mobile device and/or by a tracking manager on the server side. The MMR matching unit includes a dispatcher, a plurality of recognition units, and index tables, as well as an image registration unit. The MMR matching unit receives the image query and identifies a result including a document, the page, and the location on the page corresponding to the image query. The MMR matching unit includes a tracking manager for providing image tracking information and combining images and/or features according to various embodiments. A recognition result is returned to the mobile device via the pre-processing server or MMR gateway.

The present disclosure also includes a number of novel methods including a method for image tracking-assisted recognition, recognition of multiple images using a single image query, and improved image tracking using MMR recognition.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The techniques disclosed here are illustrated by way of example, and not by way of limitation in the figures of the accompanying drawings in which like reference numerals are used to refer to similar elements.

DETAILED DESCRIPTION

Figure 1A:
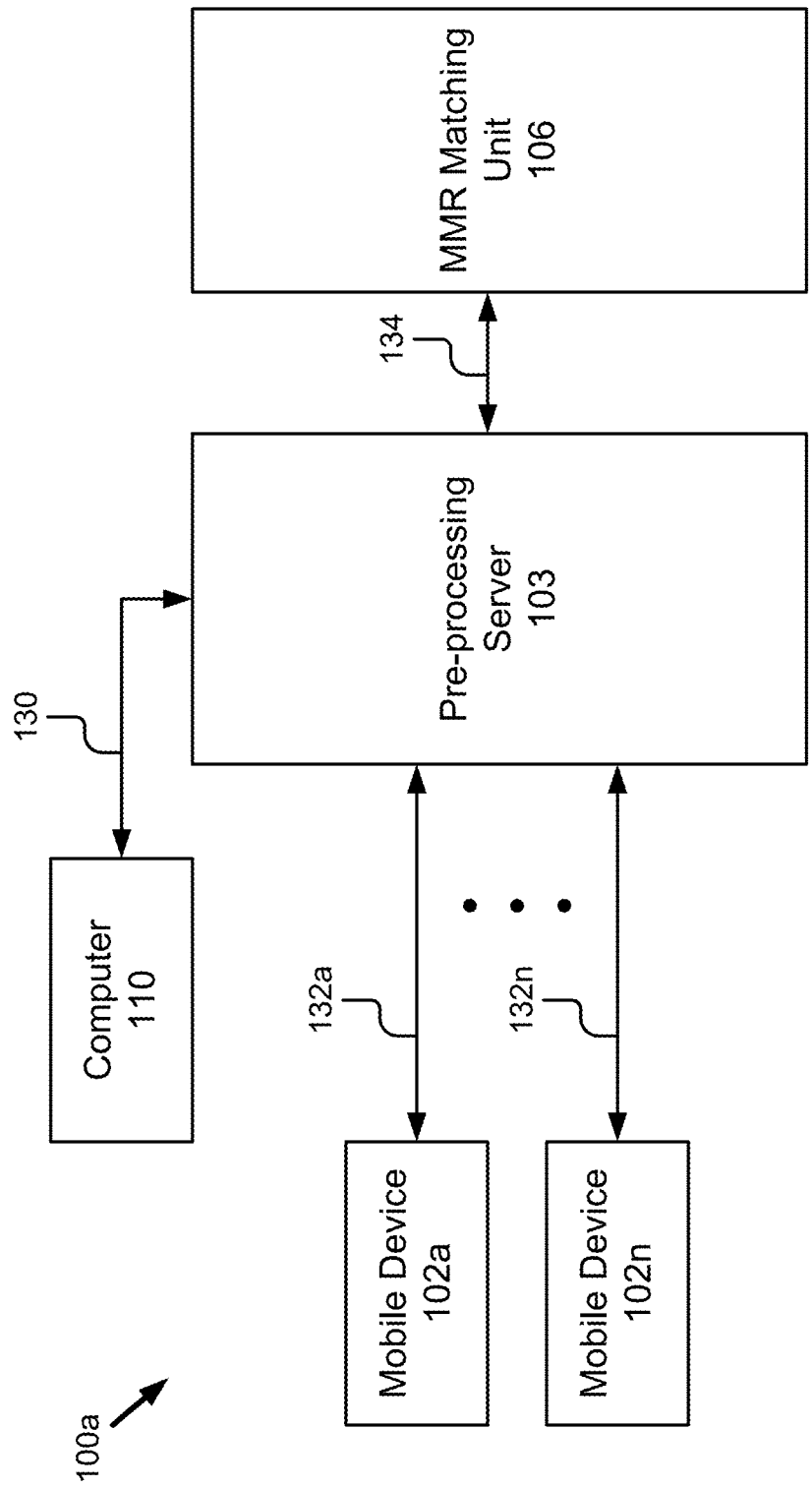
FIG. 1A is a block diagram of one embodiment of a system of mixed media reality using multiple indexes.

An architecture for a mixed media reality (MMR) system 100 capable of receiving the query images and returning document pages and location as well as receiving images, hot spots, and other data and adding such information to the MMR system is described. In the following description, for purposes of explanation, numerous specific examples are set forth in order to provide a thorough understanding of the disclosure.

Reference in the specification to "one embodiment" or "an embodiment" means that a particular feature, structure, or characteristic described in connection with the embodiment is included in at least one example embodiment. The appearances of the phrase "in one embodiment" in various places in the specification are not necessarily all referring to the same embodiment. In particular the present disclosure includes examples below of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also describes an apparatus for performing the operations disclosed herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be apparent from the description below. In addition, the techniques disclosed here are not described with reference to any particular programming language. It will be appreciated that a variety of programming languages may be used to implement the techniques as described herein.

System Overview

FIG. 1A shows an embodiment of an MMR system 100a. The MMR system 100a comprises a plurality of mobile devices 102a-102n, a pre-processing server 103, and an MMR matching unit 106. In an alternative embodiment, the pre-processing server 103 and its functionality are integrated into the MMR matching unit 106. The techniques disclosed here provide an MMR system 100a for image recognition combined with image tracking. The MMR system 100a is particularly advantageous because it provides faster and/or more accurate search results resulting from the combined use of MMR recognition and image tracking. The MMR system 100a is also advantageous because its unique architecture can be easily adapted and updated.

The mobile devices 102a-102n are communicatively coupled by signal lines 132a-132n, respectively, to the pre-processing server 103 to send a "retrieval request." A retrieval request includes one or more of "image queries," other contextual information, and metadata. In one embodiment, an image query is an image in any format, or one or more features of an image. Examples of image queries include still images, video frames and sequences of video frames. The mobile devices 102a-102n are mobile computing devices such as mobile phones, which include a camera to capture images. It should be understood that the MMR system 100a will be utilized by hundreds or even millions of users. Thus, even though only two mobile devices 102a, 102n are shown, those skilled in the art will appreciate that the pre-processing server 103 may be simultaneously coupled to, receive and respond to retrieval requests from numerous mobile devices 102a-102n. Alternate embodiments for the mobile devices 102a-102n are described in more detail below with reference to FIGS. 2A and 2B.

As noted above, the pre-processing server 103 is able to couple to hundreds if not millions of mobile computing devices 102a-102n and service their retrieval requests. The pre-processing server 103 also may be communicatively coupled to the computer 110 by signal line 130 for administration and maintenance of the pre-processing server 103. The computer 110 can be any conventional computing device such as a personal computer. The main function of the pre-processing server 103 is processing retrieval requests from the mobile devices 102a-102n and returning recognition results back to the mobile devices 102a-102n. In one embodiment, the recognition results include one or more of a Boolean value (true/false) and if true, a page ID, and a location on the page. In other embodiments, the recognition results also include one or more from the group of actions, a message acknowledging that the recognition was successful (or not) and consequences of that decision, such as the sending of an email message, a document, actions defined within a portable document file, addresses such as URLs, binary data such as video, information capable of being rendered on the mobile device 102, menus with additional actions, raster images, image features, etc. The pre-processing server 103 generates an image query and recognition parameters from the retrieval request according to one embodiment, and passes them on to the MMR matching unit 106 via signal line 134. The pre-processing server 103 also may perform some image tracking computation according to one embodiment. Embodiments and operation of the pre-processing server 103 are described in greater detail below with reference to FIG. 3A.

The MMR matching unit 106 receives the image query from the pre-processing server 103 on signal line 134 and sends it to one or more of recognition units to identify a result including a document, the page and the location on the page corresponding to the image query, referred to generally throughout this application as the "retrieval process." The result is returned from the MMR matching unit 106 to the pre-processing server 103 on signal line 134. In addition to the result, the MMR matching unit 106 may also return other related information such as hotspot data. The MMR matching unit 106 also includes components for receiving new content and updating and reorganizing index tables used in the retrieval process. The process of adding new content to the MMR matching unit 106 is referred to generally throughout this application as the "registration process." Various embodiments of the MMR matching unit 106 and is components are described in more detail below with reference to FIG. 4A-8.

Figure 1B:
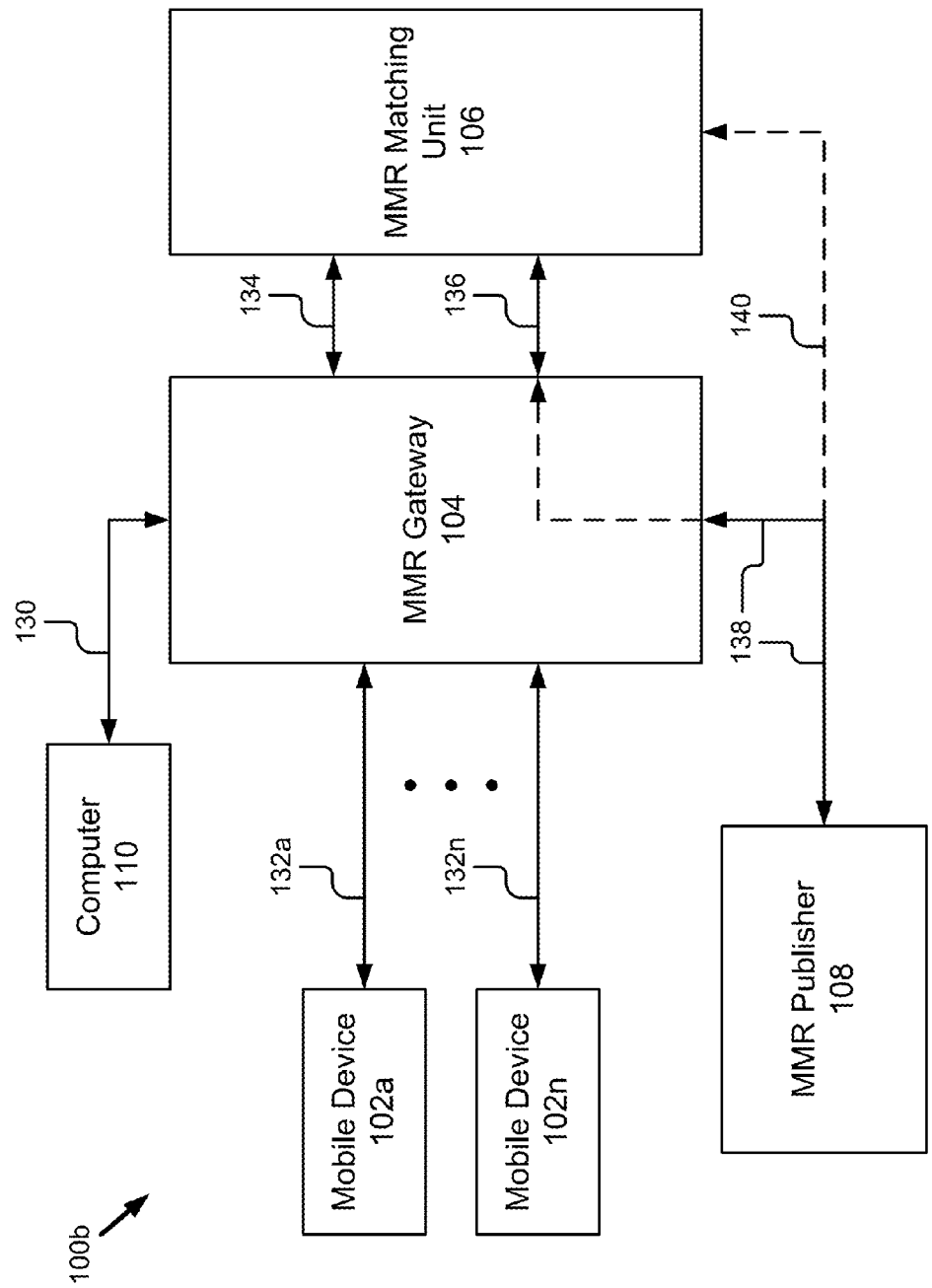
FIG. 1B is a block diagram of another embodiment of a system of mixed media reality using multiple indexes.

FIG. 1B shows an embodiment of a MMR system 100b. The MMR system 100b comprises a plurality of mobile devices 102a-102n, an MMR gateway 104, an MMR matching unit 106, an MMR publisher 108 and a computer 110. The techniques disclosed here provide, in one aspect, an MMR system 100b for use in newspaper publishing. The MMR system 100b for newspaper publishing is particularly advantageous because provides an automatic mechanism for a newspaper publisher to register images and content with the MMR system 100b. The MMR system 100b for newspaper publishing is also advantageous because it has a unique architecture adapted to respond to image queries formed of image portions or pages of a printed newspaper. The MMR system 100b is also advantageous because it provides faster and/or more accurate search results resulting from the combined use of MMR recognition and image tracking, and its unique architecture can be easily adapted and updated.

The mobile devices 102a-102n are similar to those described above, except that they are communicatively coupled by signal lines 132a-132n, respectively, to the MMR gateway 104 to send a "retrieval request," rather than to the pre-processing server 103. It should be understood that the MMR system 100b will be utilized by hundreds or even millions of users that receive a traditional publication such as a daily newspaper.

As noted above, the MMR gateway 104 is able to couple to hundreds if not millions of mobile computing devices 102a-102n and service their retrieval requests. The MMR gateway 104 is also communicatively coupled to the computer 110 by signal line 130 for administration and maintenance of the MMR gateway 104 and running business applications. In one embodiment, the MMR gateway 104 creates and presents a web portal for access by the computer 110 to run business applications as well as access logs of use of the MMR system 100b. The computer 110 can be any conventional computing device such as a personal computer. The main function of the MMR gateway 104 is processing retrieval requests from the mobile devices 102a-102n and returning recognition results back to the mobile devices 102a-102n. The types of recognition results produced by the MMR gateway 104 are similar as to those described above in conjunction with pre-processing server 103. The MMR gateway 104 processes received retrieval requests by performing user authentication, accounting, analytics and other communication. The MMR gateway 104 also generates an image query and recognition parameters from the retrieval request, and passes them on to the MMR matching unit 106 via signal line 134. Embodiments and operation of the MMR gateway 104 are described in greater detail below with reference to FIG. 3B.

The MMR matching unit 106 is similar to that described above in conjunction with FIG. 1A, except that the MMR matching unit 106 receives the image query from the MMR gateway 104 on signal line 134 as part of the "retrieval process." The result is returned from the MMR matching unit 106 to the MMR gateway 104 on signal line 134. In one embodiment, the MMR matching unit 106 is coupled to the output of the MMR publisher 108 via signal lines 138 and 140 to provide new content used to update index tables of the MMR matching unit 106. In an alternate embodiment, the MMR publisher 108 is coupled to the MMR gateway 104 by signal line 138 and the MMR gateway 104 is in turn coupled by signal line 136 to the MMR matching unit 106. In this alternate environment, MMR gateway 104 extracts augmented data such as hotspot information stores it and passes the images page references and other information to the MMR matching unit 106 for updating of the index tables.

The MMR publisher 108 includes a conventional publishing system used to generate newspapers or other types of periodicals. In one embodiment, the MMR publisher 108 also includes components for generating additional information needed to register images of printed documents with the MMR system 100. The information provided by the MMR publisher 108 to the MMR matching unit 106 includes an image file, bounding box data, hotspot data, and a unique page identification number. In the symbols of embodiment, this is a document in portable document format by Adobe Corp. of San Jose Calif. and bounding box information.

Mobile Device 102

Figure 2A:
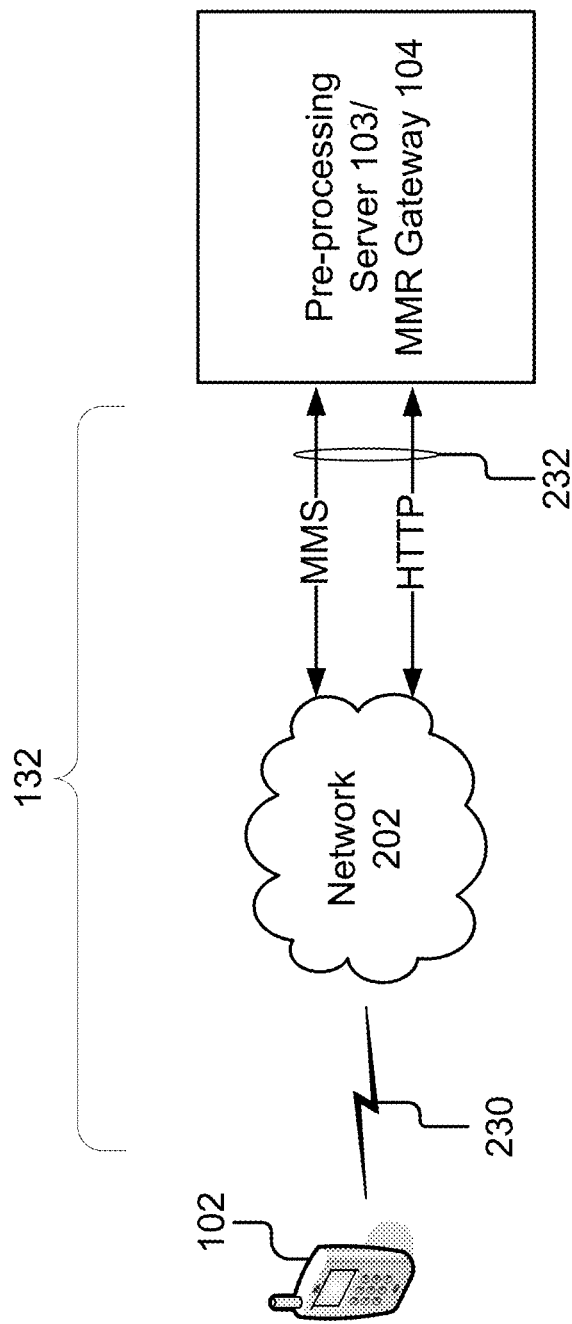
FIG. 2A is a block diagram of a first embodiment of a mobile device, network, and pre-processing server or MMR gateway.
Figure 2B:
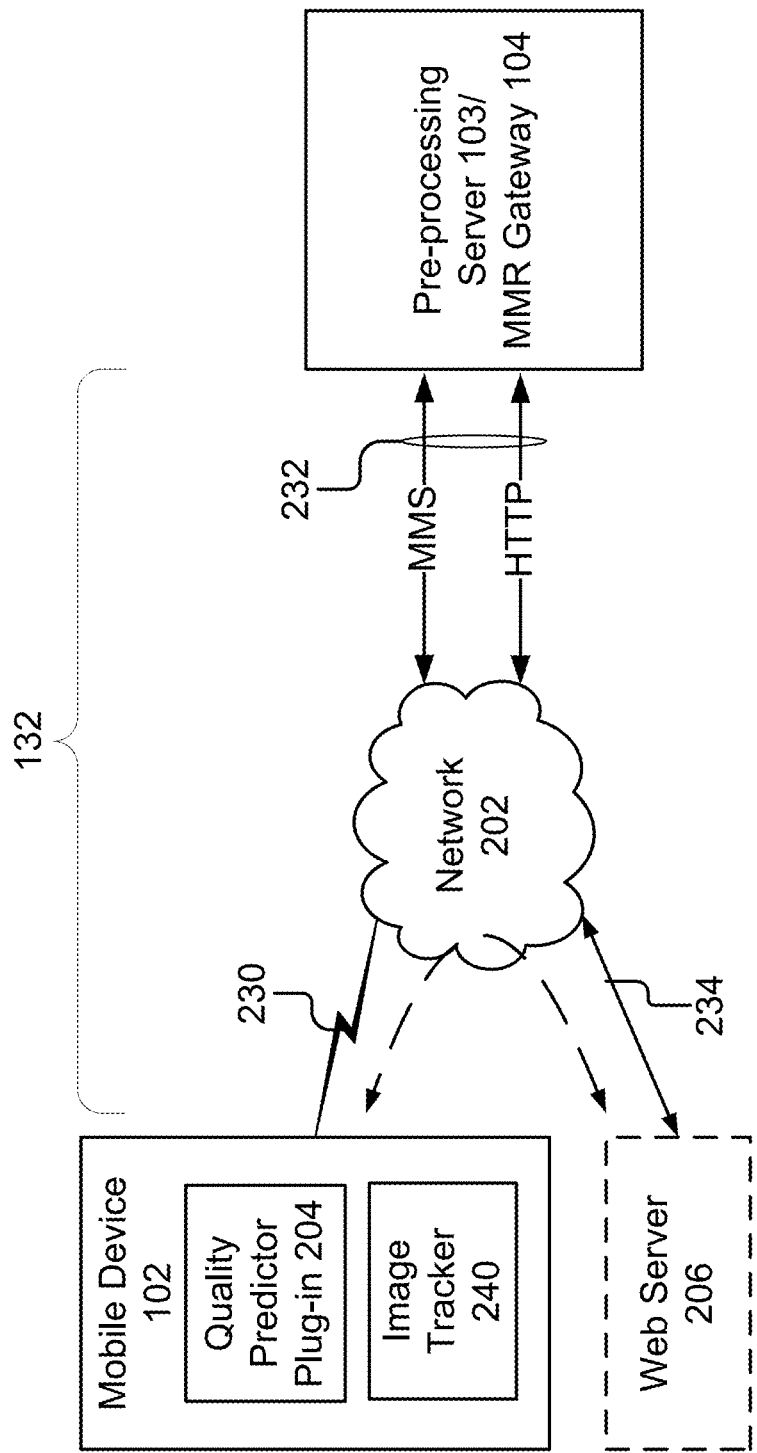
FIG. 2B is a block diagram of a second embodiment of a mobile device, network, and pre-processing server or MMR gateway.

Referring now to FIGS. 2A and 2B, the first and second embodiments of the mobile device 102 will be described.

FIG. 2A shows a first embodiment of the coupling 132 between the mobile device 102 and the pre-processing server 103 or MMR gateway 104, according to the above-described embodiments of system 100a, 100b. In the embodiment of FIG. 2A, the mobile device 102 is any mobile phone (or other portable computing device with communication capability) that includes a camera. For example, the mobile device 102 may be a smart phone such as the Blackberry® manufactured and sold by Research In Motion. The mobile device 102 is adapted for wireless communication with the network 202 by a communication channel 230. The network 202 is a conventional type such as a cellular network maintained by wireless carrier and may include a server. In this embodiment, the mobile device 102 captures an image and sends the image to the network 202 over communications channel 230 such as by using a multimedia messaging service (MMS). The network 202 can also use the communication channel 230 to return results such as using MMS or using a short message service (SMS). As illustrated, the network 202 is in turn coupled to the pre-processing server 103 or MMR gateway 104 by signal lines 232. Signal lines 232 represent a channel for sending MMS or SMS messages as well as a channel for receiving hypertext transfer protocol (HTTP) requests and sending HTTP responses. Those skilled in the art will recognize that this is just one example of the coupling between the mobile device 102 and the pre-processing server 103 or MMR gateway 104. In an alternate embodiment for example, Bluetooth®, WiFi, or any other wireless communication protocol may be used as part of communication coupling between the mobile device 102 and the pre-processing server 103 or MMR gateway 104. The mobile device 102 and the pre-processing server 103 or MMR gateway 104 could be coupled in any other ways understood by those skilled in the art (e.g., direct data connection, SMS, WAP, email) so long as the mobile device 102 is able to transmit images to the pre-processing server 103 or MMR gateway 104 and the pre-processing server 103 or MMR gateway 104 is able to respond by sending document identification, page number, and location information.

Referring now to FIG. 2B, a second embodiment of the mobile device 102 is shown. In this second embodiment, the mobile device 102 is a smart phone such as the iPhone™ manufactured and sold by Apple Computer Inc. of Cupertino Calif. The second embodiment has a number of components similar to those of the first embodiment, and therefore, like reference numbers are used to reference like components with the same or similar functionality. Notable differences between the first embodiment and the second embodiment include a quality predictor plug-in 204 that is installed on the mobile device 102, an image tracker 240, and a Web server 206 coupled by signal line 234 to the network 202. The quality predictor plug-in 204 analyzes the images captured by the mobile device 102. The quality predictor plug-in 204 provides additional information produced by its analysis and includes that information as part of the retrieval request sent to the pre-processing server 103 or MMR gateway 104 to improve the accuracy of recognition. In an alternate embodiment, the output of the quality predictor plug-in 204 is used to select which images are transmitted from the mobile device 102 to the pre-processing server 103 or MMR gateway 104. For example, only those images that have a predicted quality above a predetermined threshold (e.g., images capable of being recognized) are transmitted from the mobile device 102 to the pre-processing server 103 or MMR gateway 104. Since transmission of images requires significant bandwidth and the communication channel 230 between the mobile device 102 and the network 202 may have limited bandwidth, using the quality predictor plug-in 204 to select which images to transmit is particularly advantageous.

The second embodiment shown in FIG. 2B also illustrates how the results returned from the pre-processing server 103 or MMR gateway 104, or other information provided by the quality predictor plug-in 204, can be used by the mobile device 102 to access hotspot or augmented information available on a web server 206. In such a case, the results from the pre-processing server 103 or MMR gateway 104 or output of the quality predictor plug-in 204 would include information that can be used to access Web server 206 such as with a conventional HTTP request and using web access capabilities of the mobile device 102.

The image tracker 240 is software and routines that allow recognition and tracking of the look-at position and viewing region of the mobile device 102 based on received images, and may do so according to image tracking methods known in the art, sometimes referred to as "motion tracking." For example, for current motion estimation algorithms, see Kuhn, P., "Algorithm, Complexity Analysis and VLSI Architectures for MPEG-4 Motion Estimation," Kluwer Academic Publishers, Norwell, Mass. (1999). The image tracker 240 may include software and routines for tracking camera motion as a projective transformation across video frames, tracking camera motion with respect to the position of a paper, associating received images with recognized images, and correcting accumulated drift. The image tracker 240 is further described in conjunction with FIG. 8.

Figure 8:
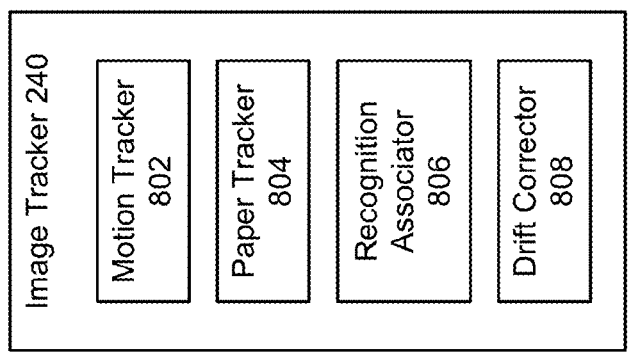
FIG. 8 is a block diagram of an embodiment of an image tracker.

FIG. 8 is a block diagram of an embodiment of an image tracker 240. The image tracker 240 receives images and provides image tracking information to the mobile device client 250. In this embodiment, if the image tracker 240 identifies the received image to belong to the same page as the last image submitted to the pre-processing server 103 or MMR gateway 104, the current image is not sent for recognition, and the position returned for the tracker is used instead. This is advantageous as results are provided immediately to the user without the need to transmit the current image to the recognition server.

In another embodiment, the image tracker 240 receives images and provides image tracking information to the pre-processing server 103 or MMR gateway 104 and MMR matching unit 106 for use during the image recognition process. The image tracker 240 also may combine images or sets of features from images, produce image tracking information, update image tracking information. The image tracker 240 may perform each of these functions as a whole or some or all of them may be performed by a tracking manager 403, described in further detail in conjunction with FIGS. 4A-4B. When the tracking manager 403 performs at least some of these functions, the image tracker 240 also may provide information regarding how images can be combined, e.g., relative timing of when images were received. The image tracker 240 includes a motion tracker 802, a paper tracker 804, a recognition associator 806, and a drift corrector 808 according to one embodiment.

The motion tracker 802 is software and routines for tracking camera motion (e.g., for a camera on mobile device 102) as a projective transformation across video frames. The motion tracker 802 uses a first video frame as a reference frame, and then outputs information indicating movement of the camera. Thus, the motion tracker 802 provides information about the relative motion of the camera between frames. The video tracker 802 provides image tracking information as output.

The paper tracker 804 is software and routines for tracking camera motion with respect to the position of a paper document. The paper tracker 804 uses the plane of the paper document as a reference frame, and outputs information indicating the position of the camera relative to the paper document plane.

The recognition associator 806 is software and routines for associating image tracking information, e.g., as provided by motion tracker 802, with the recognition processes described herein. The recognition associator 806, e.g., updates tracking information to reflect an absolute location of a received image on a page as determined by MMR recognition.

Figure 13:
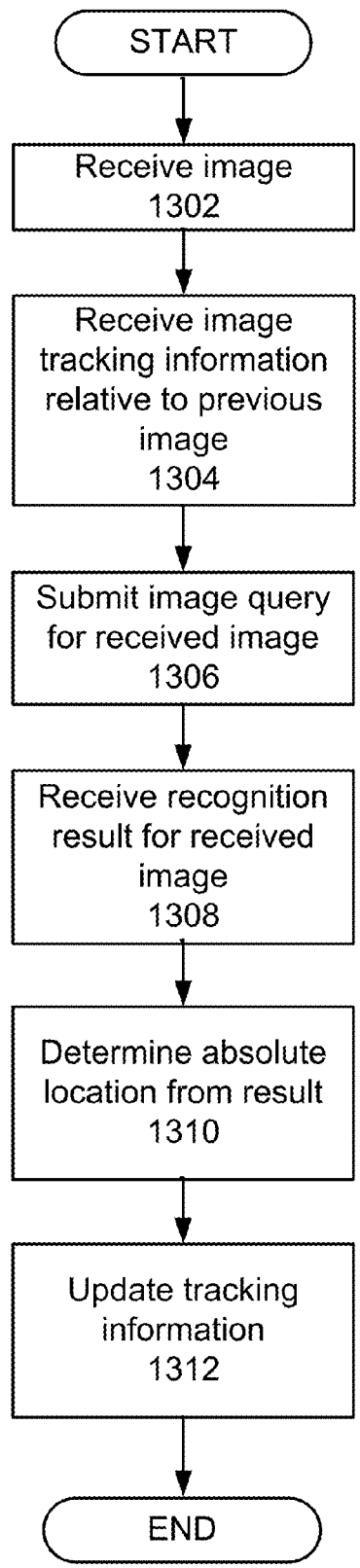
FIG. 13 is a flowchart showing a method of improved image tracking using MMR.

The drift corrector 808 is software and routines for correcting accumulated camera drift, e.g., according to the method of FIG. 13. The drift corrector 808 is in communication with the paper tracker 804 for to ensure that the document page, location, and viewing area are properly aligned with the paper document and provide drift correction information to the paper tracker 804.

It should be noted that regardless of whether the first embodiment or the second embodiment of the mobile device 102 is used according to FIGS. 2A and 2B, the mobile device 102 generates a retrieval request that includes: a query image, a user or device ID, a command, and other contact information such as device type, software, plug-ins, location (for example if the mobile device includes a GPS capability), device and status information (e.g., device model, macro lens on/off status, autofocus on/off, vibration on/off, tilt angle, etc), context-related information (weather at the phone's location, time, date, applications currently running on the phone), user-related information (e.g., id number, preferences, user subscriptions, user groups and social structures, action and action-related meta data such as email actions and emails waiting to be sent), etc.

Referring now to FIGS. 2C-2H, various embodiments are shown of a plug-in (client 250) for the mobile device 102, the pre-processing server 103 or MMR gateway 104 and MMR matching unit 106 represented generally as including a server 252 that has various possible configurations. As shown in dotted notation in FIGS. 2C-2H, the image tracker 240 and tracking manager 403 described herein optionally may be included in the various configurations. More particularly, FIGS. 2C-2H illustrate how the components of the plug-in or client 250 can have varying levels of functionality and the server 252 can also have varying levels of functionality that parallel or match with the functionality of the client 250. In the various embodiments of FIGS. 2C-2H, either the client 250 or the server 252 includes: an MMR database 254, a capture module 260 for capturing an image or video, a preprocessing module 262 for processing the image before feature extraction for improved recognition such as quality prediction; a feature extraction module 264 for extracting image features, a retrieval module 266 for using features to retrieve information from the MMR database 254, a send message module 268 for sending messages from the server 252 to the client 250, an action module 270 for performing an action, a preprocessing and prediction module 272 for processing the image prior to feature extraction, a feedback module 274 for presenting information to the user and receiving input, a sending module 276 for sending information from the client 250 to the server 252, and a streaming module 278 for streaming video from the client 250 to the server 252.

Figure 2C:
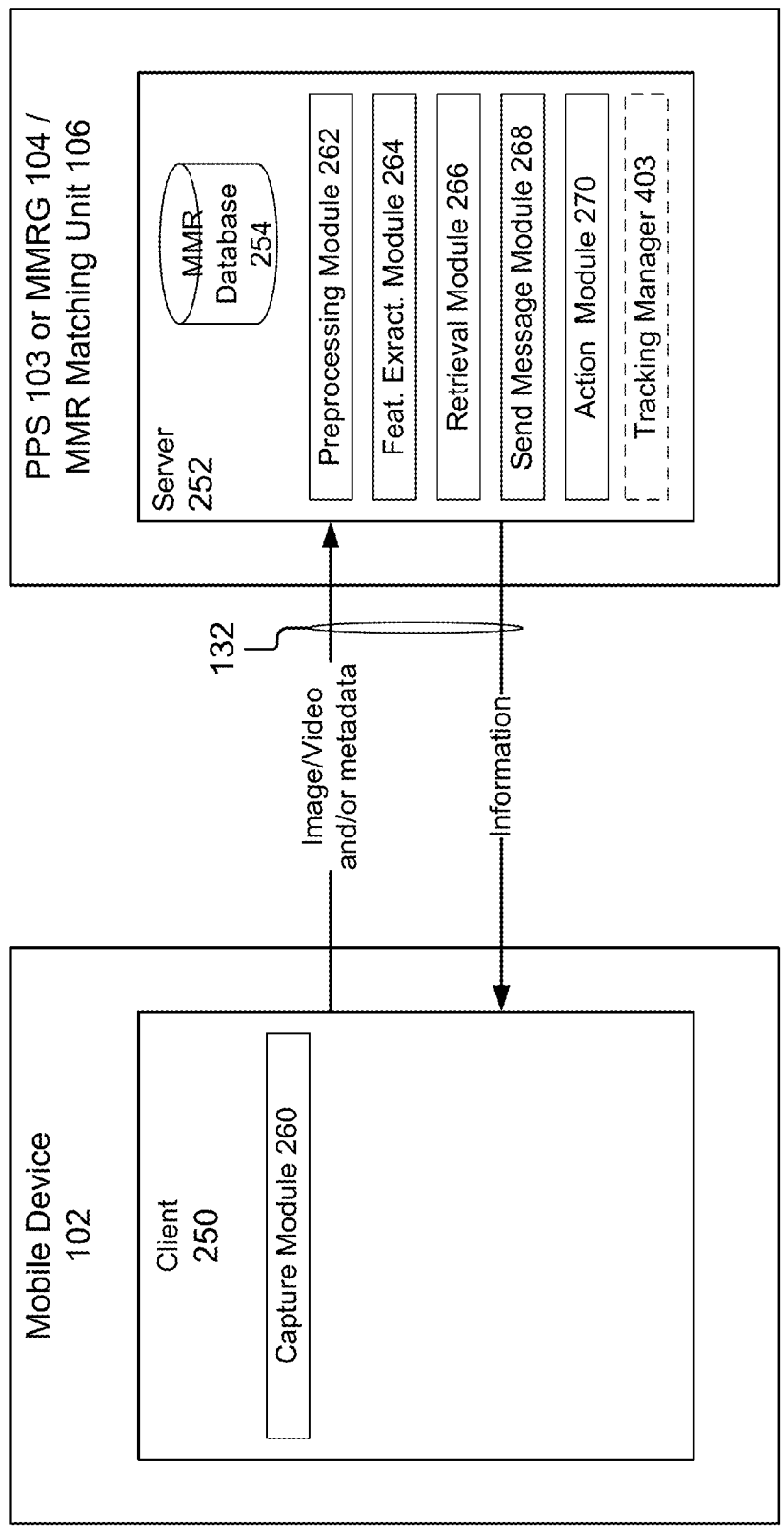
FIGS. 2C-2H are block diagrams of various embodiments of a mobile device plug-in, pre-processing server or MMR gateway, and MMR matching unit showing various possible configurations.

FIG. 2C illustrates one embodiment for the client 250 and the server 252 in which the client 250 sends an image or video and/or metadata to the server 252 for processing. In this embodiment, the client 250 includes the capture module 260. The server 252 includes: the MMR database 254, the preprocessing module 262, the feature extraction module 264, the retrieval module 266, the send message module 268 and the action module 270. In this example, most of the image tracking functionality is performed by the tracking manager 403 on the server 252; only the minimum information required from the image tracker 240, e.g., timing information for received images, is provided on the client 250.

Figure 2D:
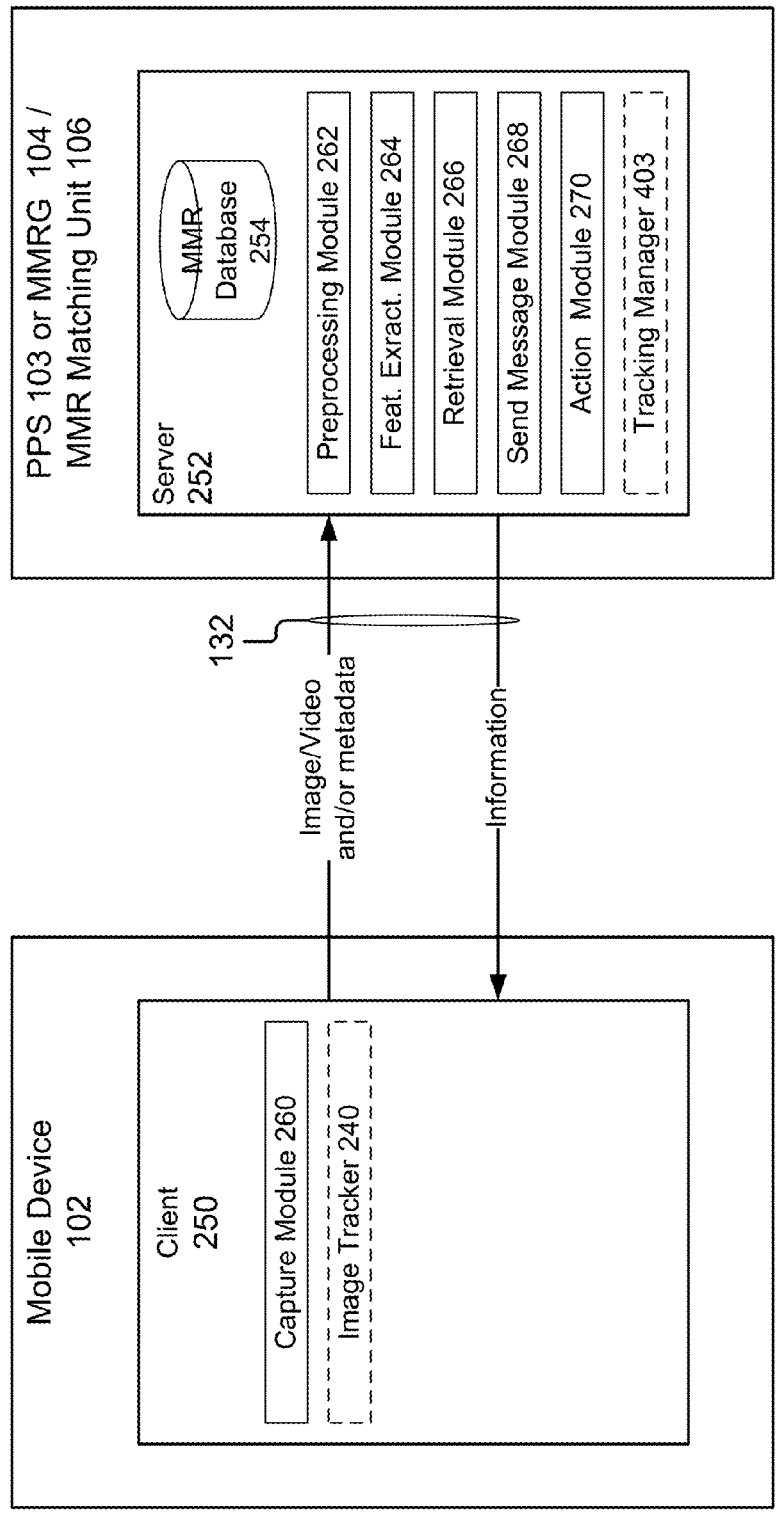

FIG. 2D illustrates another embodiment for the client 250 and the server 252 in which the client 250 captures an image or video, runs quality prediction, and sends an image or video and/or metadata to the server 252 for processing. In this embodiment, the client 250 includes: the capture module 260, the preprocessing and prediction module 272, the feedback module 274 and the sending module 276. The server 252 includes: the MMR database 254, the preprocessing module 262, the feature extraction module 264, the retrieval module 266, the send message module 268 and the action module 270. It should be noted that in this embodiment the image sent to the server 252 may be different than the captured image. For example, it may be digitally enhanced, sharpened, or may be just binary data. In this example, the image tracking functionality is shared by the image tracker 240 and the tracking manager 403.

Figure 2E:
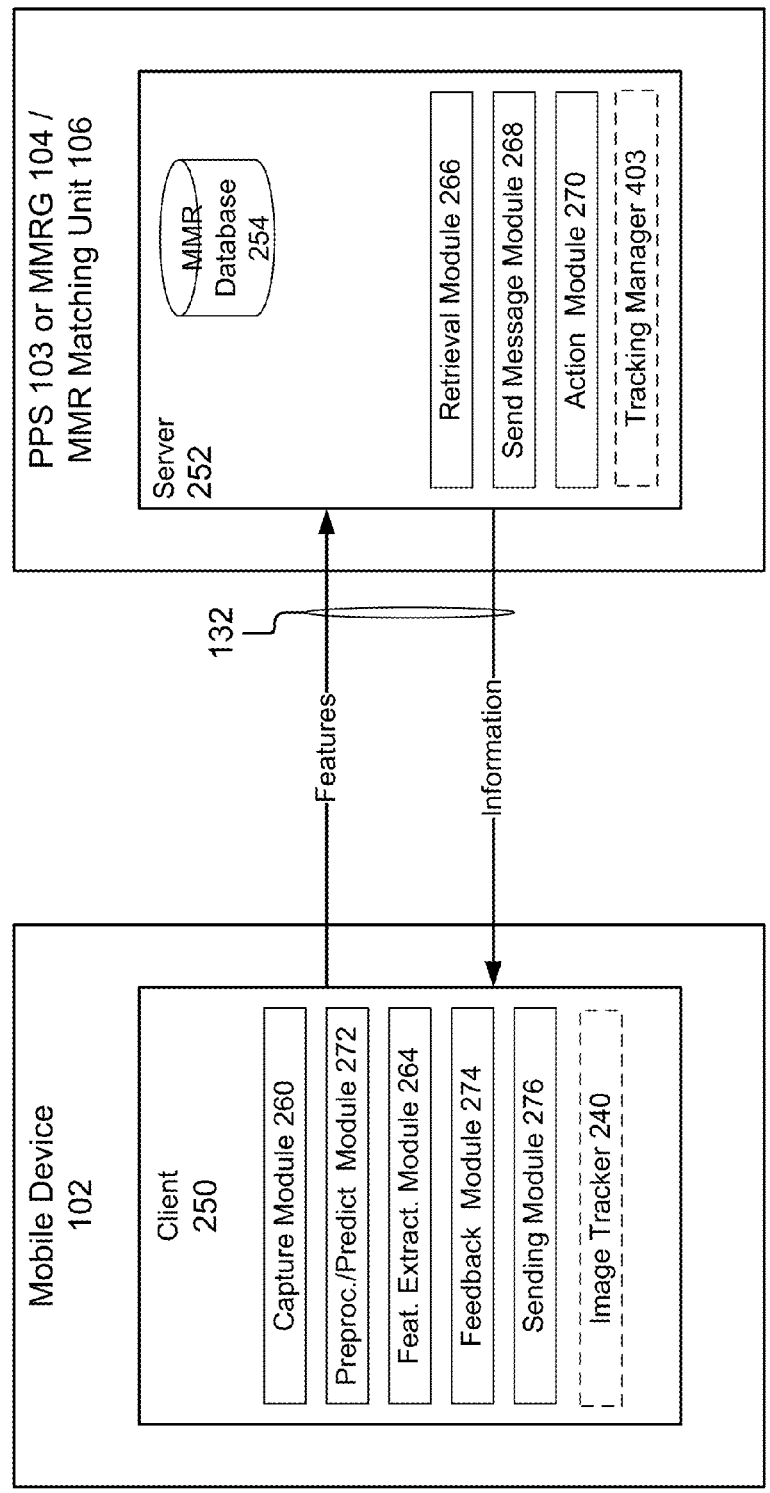

FIG. 2E illustrates another embodiment for the client 250 and the server 252 in which the client 250 captures an image or video, performs feature extraction, and sends image features to the server 252 for processing. In this embodiment, the client 250 includes: the capture module 260, the feature extraction module 264, the preprocessing and prediction module 272, the feedback module 274 and the sending module 276. The server 252 includes: the MMR database 254, the retrieval module 266, the send message module 268, and the action module 270. It should be noted that in this embodiment feature extraction may include preprocessing. After features are extracted, the preprocessing and prediction module 272 may run on these features and if the quality of the features is not satisfactory, the user may be asked to capture another image. In this example, most of the image tracking functionality is provided by the image tracker 240.

Figure 2F:
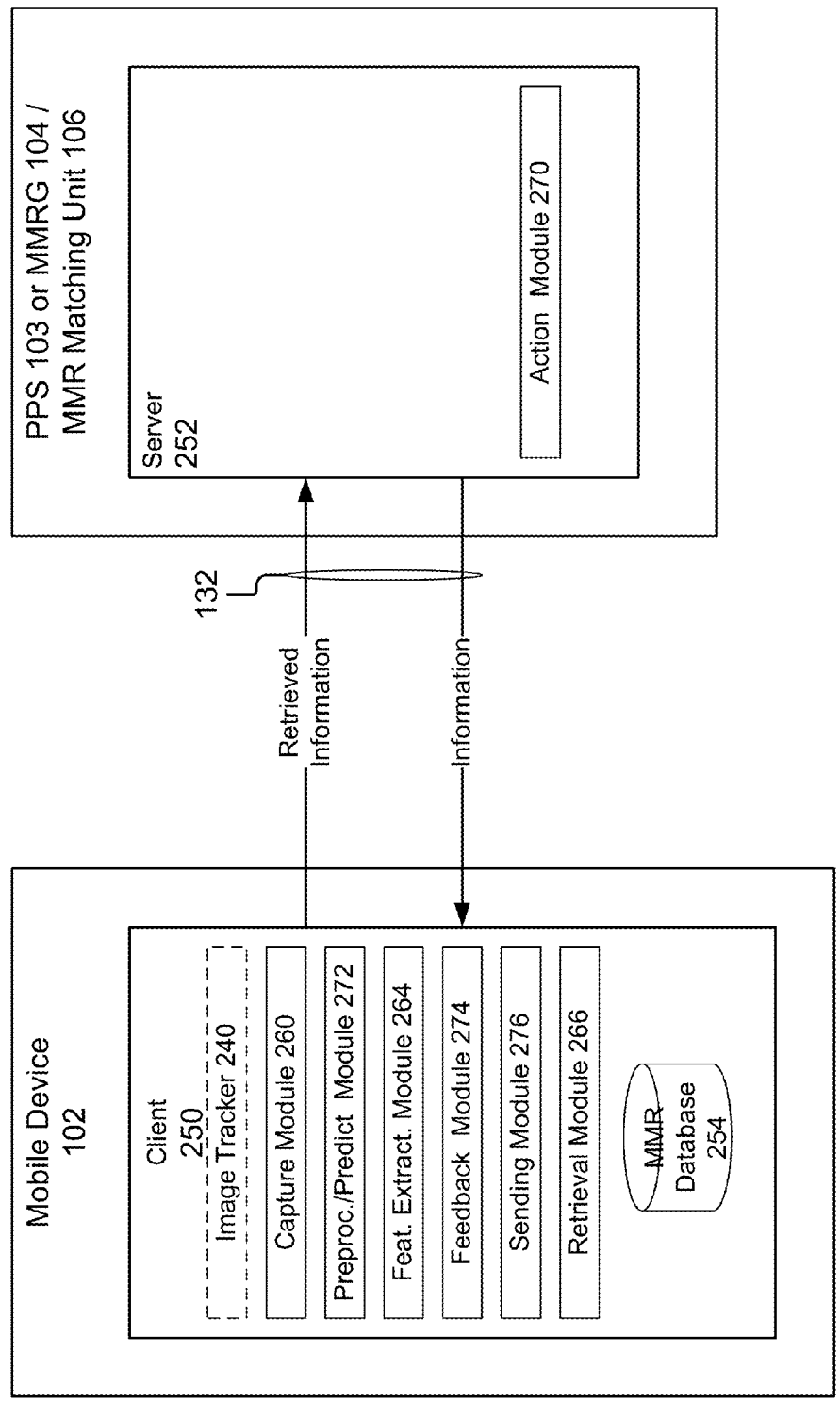

FIG. 2F illustrates another embodiment for the client 250 and the server 252 in which the entire retrieval process is performed at the client 250. In this embodiment, the client 250 includes: the capture module 260, the feature extraction module 264, the preprocessing and prediction module 272, the feedback module 274, and the sending module 276, the MMR database 254, and the retrieval module 266. The server 252 need only have the action module 270. In this example, all of the image tracking functionality is provided by the image tracker 240.

Figure 2G:
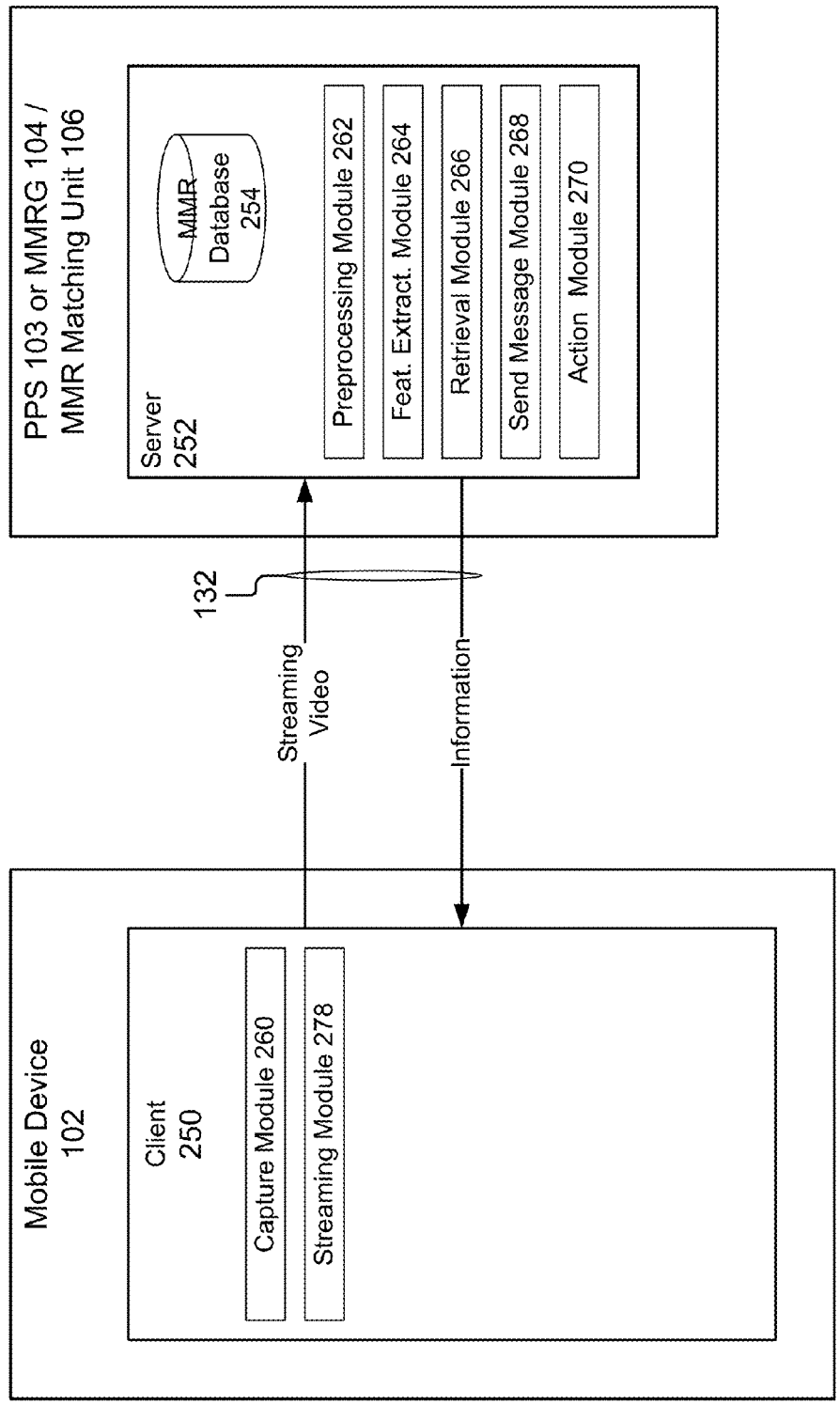

FIG. 2G illustrates another embodiment for the client 250 and the server 252 in which the client 250 streams video to the server 252. In this embodiment, the client 250 includes the capture module 260 and a streaming module 278. The server 252 includes the MMR database 254, the preprocessing module 262, the feature extraction module 264, the retrieval module 266, the send message module 268, and the action module 270. Although not shown, the client 250 can run a predictor in the captured video stream and provide user feedback on where to point the camera or how to capture better video for retrieval. In a modification of this embodiment, the server 252 streams back information related to the captured video and the client 250 can overlay that information on a video preview screen. In this example, most of the image tracking functionality is provided by the tracking manager 403.

Figure 2H:
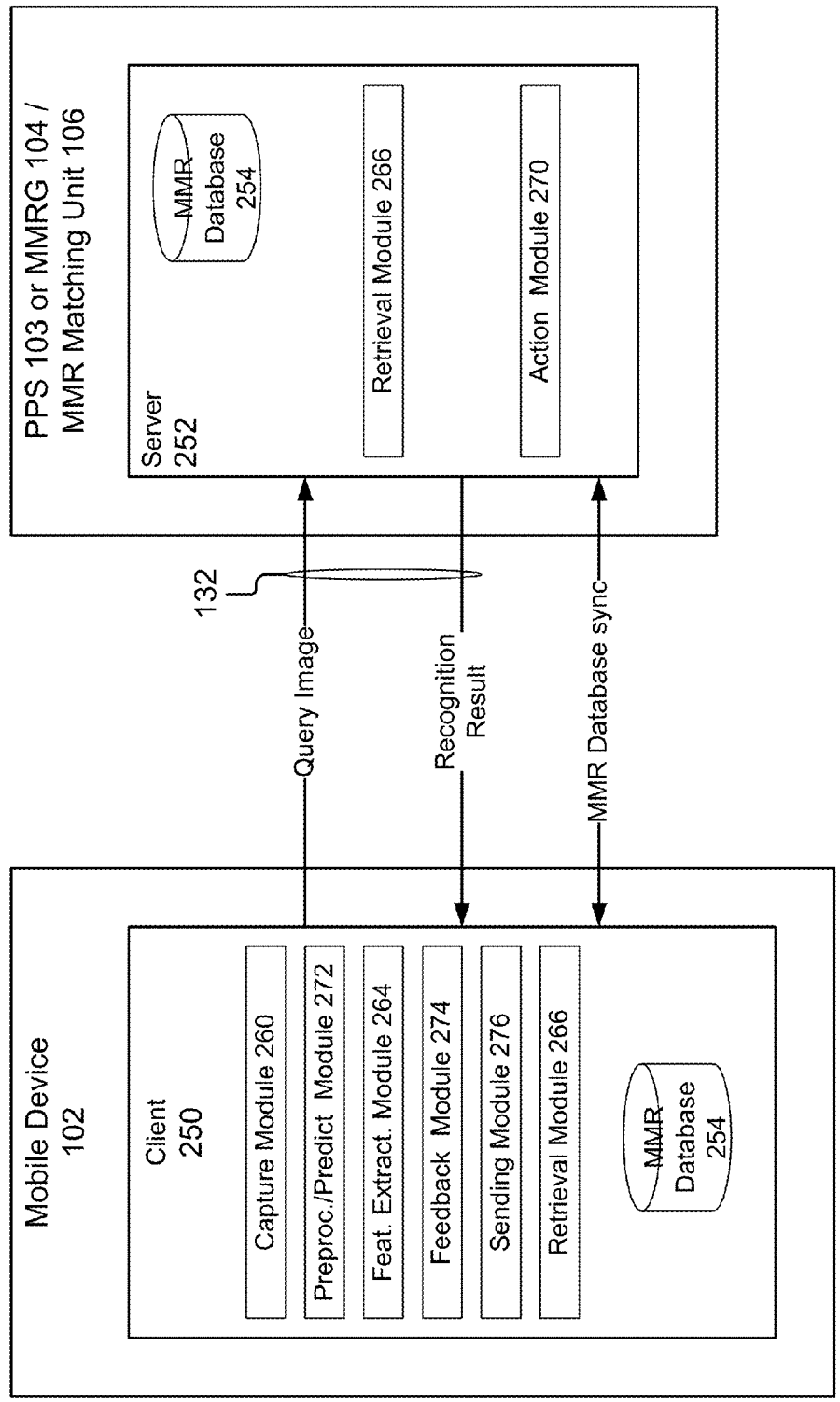

FIG. 2H illustrates another embodiment for the client 250 and the server 252 in which the client 250 runs a recognizer and the server 252 streams MMR database information to a local database operable with the client 250 based upon a first recognition result. This embodiment is similar to that described above with reference to FIG. 2F. For example, the entire retrieval process for one recognition algorithm is run at the client 250. If the recognition algorithm fails, the query is handed to the server 252 for running more complex retrieval algorithm. In this embodiment, the client 250 includes: the capture module 260, the feature extraction module 264, the preprocessing and prediction module 272, the feedback module 274, the sending module 276, the MMR database 254 (a local version), and the retrieval module 266. The server 252 includes another retrieval module 266, the action module 270, and the MMR database 254 (a complete and more complex version). In one embodiment, if the query image cannot be recognized with the local MMR database 254, the client 250 sends an image for retrieval to the server 252 and that initiates an update of the local MMR database 254. Alternatively, the client 250 may contain an updated version of a database for one recognizer, but if the query image cannot be retrieved from the local MMR database 254, then a database for another retrieval algorithm may be streamed to the local MMR database 254. In this example, all of the image tracking functionality is provided by the image tracker 240.

Pre-Processing Server 103

Figure 3A:
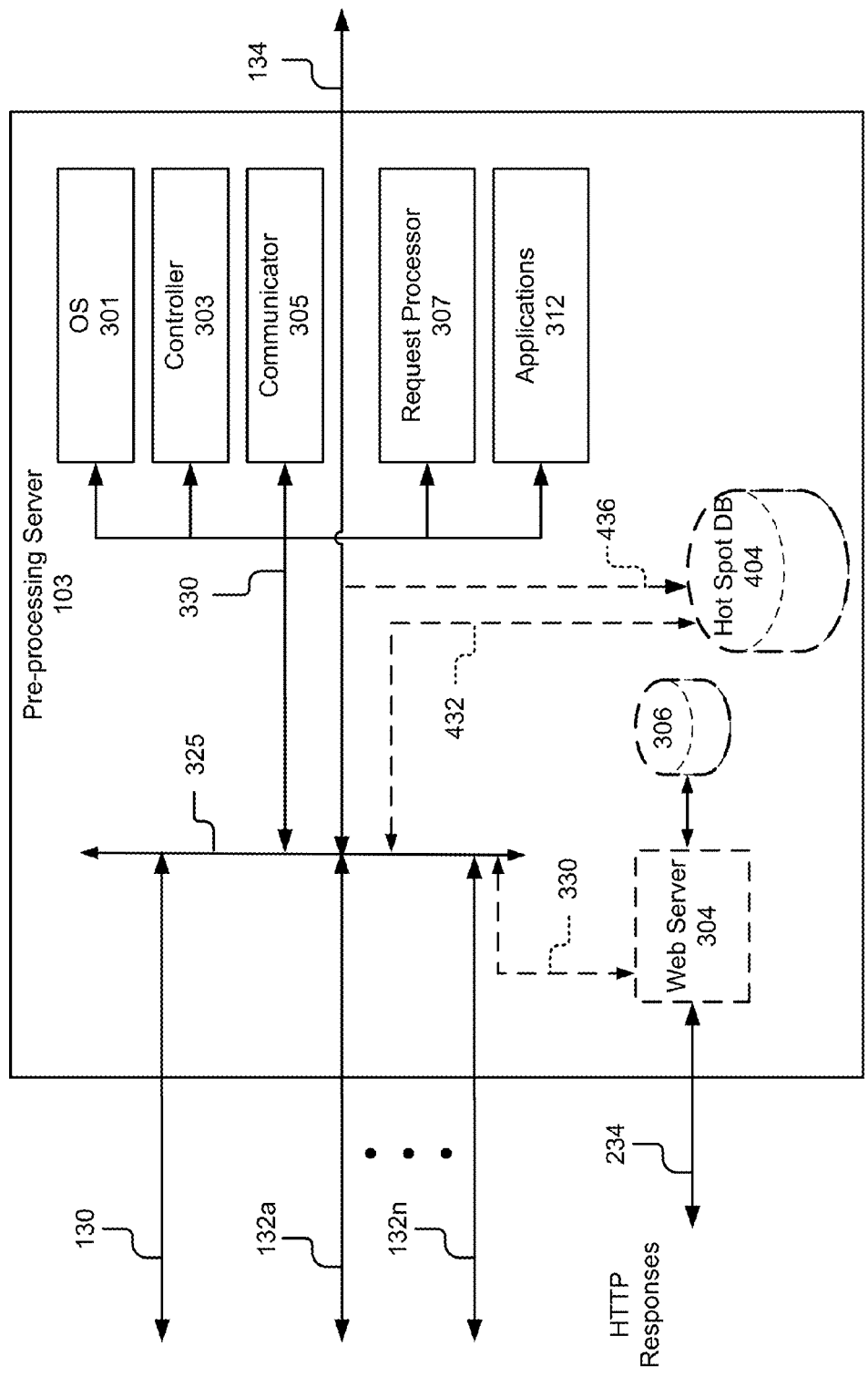
FIG. 3A is a block diagram of an embodiment of a pre-processing server.

Referring now to FIG. 3A, one embodiment of the pre-processing server 103 is shown. This embodiment of the pre-processing server 103 comprises an operating system (OS) 301, a controller 303, a communicator 305, a request processor 307, and applications 312, connected to system bus 325. Optionally, the pre-processing server 103 also may include a web server 304, a database 306, and/or a hotspot database 404.

As noted above, one of the primary functions of the pre-processing server 103 is to communicate with many mobile devices 102 to receive retrieval requests and send responses including a status indicator (true=recognized/false=not recognized), a page identification number, a location on the page and other information, such as hotspot data. A single pre-processing server 103 can respond to hundreds or millions of retrieval requests. For convenience and ease of understanding only a single pre-processing server 103 is shown in FIGS. 1A and 3A, however, those skilled in the art will recognize that in other embodiments any number of pre-processing servers 103 may be utilized to service the needs of a multitude of mobile devices 102. More particularly, the pre-processing server 103 system bus 325 is coupled to signal lines 132a-132n for communication with various mobile devices 102. The pre-processing server 103 receives retrieval requests from the mobile devices 102 via signal lines 132a-132n and sends responses back to the mobile devices 102 using the same signal lines 132a-132n. In one embodiment, the retrieval request includes: a command, a user identification number, an image, and other context information. For example, other context information may include: device information such as the make, model or manufacture of the mobile device 102; location information such as provided by a GPS system that is part of the mobile device or by triangulation; environmental information such as time of day, temperature, weather conditions, lighting, shadows, object information; and placement information such as distance, location, tilt, and jitter.

The pre-processing server 103 also is coupled to signal line 130 for communication with the computer 110. Again, for convenience and ease of understanding only a single computer 110 and signal line 130 are shown in FIGS. 1A and 3A, but any number of computing devices may be adapted for communication with the pre-processing server 103. The pre-processing server 103 facilitates communication between the computer 110 and the operating system (OS) 301, a controller 303, a communicator 305, a request processor 307, and applications 312. The OS 301, controller 303, communicator 305, request processor 307, and applications 312 are coupled to system bus 325 by signal line 330.

The pre-processing server 103 processes the retrieval request and generates an image query and recognition parameters that are sent via signal line 134, which also is coupled to system bus 325, and to the MMR matching unit 106 for recognition. The pre-processing server 103 also receives recognition responses from the MMR matching unit 106 via signal line 134. More specifically, the request processor 307 processes the retrieval request and sends information via signal line 330 to the other components of the pre-processing server 103 as will be described below.

The operating system 301 is preferably a custom operating system that is accessible to computer 110, and otherwise configured for use of the pre-processing server 103 in conjunction with the MMR matching unit 106. In an alternate embodiment, the operating system 301 is one of a conventional type such as, WINDOWS®, Mac OS X®, SOLARIS®, or LINUX® based operating systems. The operating system 301 is connected to system bus 325 via signal line 330.

The controller 303 is used to control the other modules 305, 307, 312, per the description of each below. While the controller 303 is shown as a separate module, those skilled in the art will recognize that the controller 303 in another embodiment may be distributed as routines in other modules. The controller 303 is connected to system bus 325 via signal line 330.

The communicator 305 is software and routines for sending data and commands among the pre-processing server 103, mobile devices 102, and MMR matching unit 106. The communicator 305 is coupled to signal line 330 to send and receive communications via system bus 325. The communicator 305 communicates with the request processor 307 to issue image queries and receive results.

The request processor 307 processes the retrieval request received via signal line 330, performing preprocessing and issuing image queries for sending to MMR matching unit 106 via signal line 134. In various embodiments, the pre-processing may include feature extraction and recognition parameter definition. The request processor 307 also sends information via signal line 330 to the other components of the pre-processing server 103. The request processor 307 is connected to system bus 325 via signal line 330.

The one or more applications 312 are software and routines for providing functionality related to the processing of MMR documents. The applications 312 can be any of a variety of types, including without limitation, drawing applications, word processing applications, electronic mail applications, search application, financial applications, and business applications adapted to utilize information related to the processing of retrieval quests and delivery of recognition responses such as but not limited to accounting, groupware, customer relationship management, human resources, outsourcing, loan origination, customer care, service relationships, etc. In addition, applications 312 may be used to allow for annotation, linking additional information, audio or video clips, building e-communities or social networks around the documents, and associating educational multimedia with recognized documents.

System bus 325 represents a shared bus for communicating information and data throughout pre-processing server 103. System bus 325 may represent one or more buses including an industry standard architecture (ISA) bus, a peripheral component interconnect (PCI) bus, a universal serial bus (USB), or some other bus known in the art to provide similar functionality. Additional components may be coupled to pre-processing server 103 through system bus 325 according to various embodiments.

The pre-processing server 103 optionally also includes a web server 304, a database 306, and/or a hotspot database 404 according to various embodiments.

The web server 304 is a conventional type and is responsible for accepting HTTP requests from web clients and sending responses along with data contents, such as web pages, documents, and linked objects (images, etc.) The Web server 304 is coupled to data store 306 such as a conventional database. The Web server 304 is adapted for communication via signal line 234 to receive HTTP requests from any communication device, e.g., mobile devices 102, across a network such as the Internet. The Web server 304 also is coupled to signal line 330 as described above to receive Web content associated with hotspots for storage in the data store 306 and then for later retrieval and transmission in response to HTTP requests. Those skilled in the art will understand that inclusion of the Web server 304 and data store 306 as part of the pre-processing server 103 is merely one embodiment and that the Web server 304 and the data store 306 may be operational in any number of alternate locations or configuration so long as the Web server 304 is accessible to mobile devices 102 and computers 110 via the Internet.

In one embodiment, the pre-processing server 103 also includes a hotspot database 404. The hotspot database 404 is shown in FIG. 3A with dashed lines to reflect that inclusion in the pre-processing server 103 is an alternate embodiment. The hotspot database 404 is coupled by signal line 436 to receive the recognition responses via line 134. The hotspot database 404 uses these recognition responses to query the database and output via line 432 and system bus 325 the hotspot content corresponding to the recognition responses. This hotspot content is included with the recognition responses sent to the requesting mobile device 102.

MMR Gateway 104

Figure 3B:
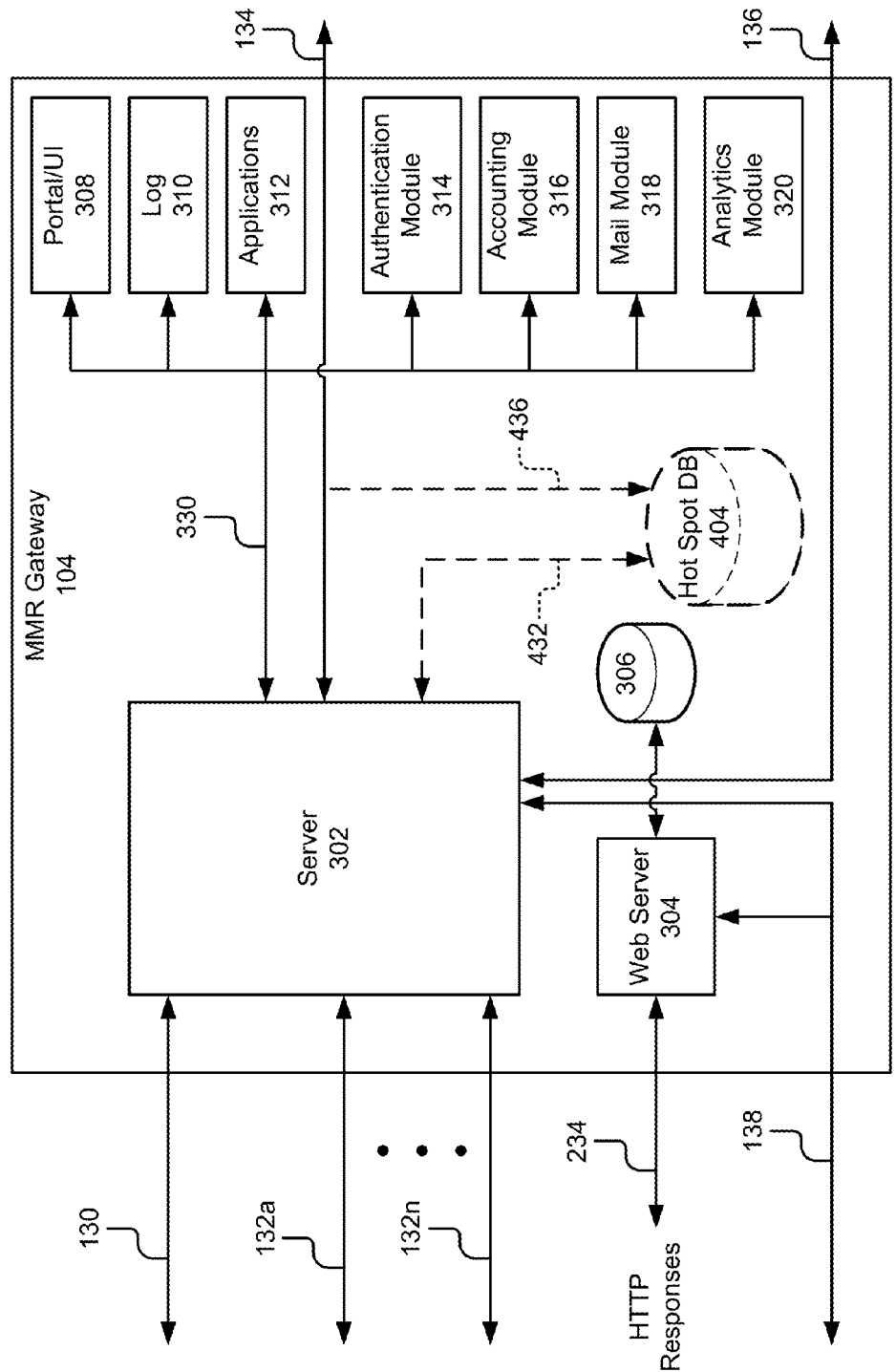
FIG. 3B is a block diagram of an embodiment of an MMR gateway.

Referring now to FIG. 3B, one embodiment of the MMR gateway 104 is shown. This embodiment of the MMR gateway 104 comprises a server 302, a Web server 304, a data store 306, a portal module 308, a log 310, one or more applications 312, an authentication module 314, an accounting module 316, a mail module 318, and an analytics module 320.

As noted above, one of the primary functions of the MMR gateway 104 is to communicate with many mobile devices 102 to receive retrieval requests and send responses including a status indicator (true=recognized/false=not recognized), a page identification number, a location on the page and other information such as hotspot data. A single MMR gateway 104 can respond to hundreds or millions of retrieval requests. For convenience and ease of understanding only a single MMR gateway 104 is shown in FIGS. 1B and 3B, however, those skilled in the art will recognize that in other embodiments any number of MMR gateways 104 may be utilized to service the needs of a multitude of mobile devices 102. More particularly, the server 302 of the MMR gateway 104 is coupled to signal lines 132a-132n for communication with various mobile devices 102. The server 302 receives retrieval requests from the mobile devices 102 via signal lines 132a-132n and sends responses back to the mobile devices 102 using the same signal lines 132a-132n. In one embodiment, the retrieval request includes: a command, a user identification number, an image and other context information. For example, other context information may include: device information such as the make, model or manufacture of the mobile device 102; location information such as provided by a GPS system that is part of the mobile device or by triangulation; environmental information such as time of day, temperature, weather conditions, lighting, shadows, object information; and placement information such as distance, location, tilt, and jitter.

The server 302 is also coupled to signal line 130 for communication with the computer 110. Again, for convenience and ease of understanding only a single computer 110 and signal line 130 are shown in FIGS. 1B and 3B, but any number of computing devices may be adapted for communication with the server 302. The server 302 facilitates communication between the computer 110 and the portal module 308, the log module 310 and the applications 312. The server 302 is coupled to the portal module 308, the log module 310 and the applications 312 by signal line 330. As will be described in more detail below, the module cooperate with the server 302 to present a web portal that provides a user experience for exchanging information. The Web portal 308 can also be used for system monitoring, maintenance and administration.

The server 302 processes the retrieval request and generates an image query and recognition parameters that are sent via signal line 134 to the MMR matching unit 106 for recognition. The server 302 also receives recognition responses from the MMR matching unit 106 via 5 signal line 134. The server 302 also processes the retrieval request and sends information via signal line 330 to the other components of the MMR gateway 104 as will be described below. The server 302 is also adapted for communication with the MMR publisher 108 by signal line 138 and the MMR matching unit 106 via signal line 136. The signal line 138 provides a path for the MMR publisher 108 to send Web content for hotspots to the Web server 304 and to provide other information to the server 302. In one embodiment, the server 302 receives information from the MMR publisher 108 and sends that information via signal line 136 for registration with the MMR matching unit 106.

The web server 304 is a conventional type and is responsible for accepting requests from clients and sending responses along with data contents, such as web pages, documents, and linked objects (images, etc.) The Web server 304 is coupled to data store 306 such as a conventional database. The Web server 304 is adapted for communication via signal line 234 to receive HTTP requests from any communication device across a network such as the Internet. The Web server 304 is also coupled to signal line 138 as described above to receive Web content associated with hotspots for storage in the data store 306 and then for later retrieval and transmission in response to HTTP requests. Those skilled in the art will understand that inclusion of the Web server 304 and data store 306 as part of the MMR gateway 104 is merely one embodiment and that the Web server 304 and the data store 306 may be operational in any number of alternate locations or configuration so long as the Web server 304 is accessible to mobile devices 102 and computers 110 via the Internet.

In one embodiment, the portal module 308 is software or routines operational on the server 302 for creation and presentation of the Web portal. The portal module 308 is coupled to signal line 330 for communication with the server 302. In one embodiment, the web portal provides an access point for functionality including administration and maintenance of other components of the MMR gateway 104. In another embodiment, the web portal provides an area where users can share experiences related to MMR documents. In yet another embodiment, the web portal but an area where users can access business applications and the log 310 of usage.

The log 310 is a memory or storage area for storing a list of the retrieval request received by the server 302 from mobile devices 102 and all corresponding responses sent by the server 302 to the mobile device. In another embodiment, the log 310 also stores a list of the image queries generated and sent to the MMR matching unit 106 and the recognition responses received from the MMR matching unit 106. The log 310 is coupled to signal line 330 for access by the server 302.

The one or more business applications 312 are software and routines for providing functionality related to the processing of MMR documents. In one embodiment the one or more business applications 312 are executable on the server 302. The business applications 312 can be any one of a variety of types of business applications adapted to utilize information related to the processing of retrieval quests and delivery of recognition responses such as but not limited to accounting, groupware, customer relationship management, human resources, outsourcing, loan origination, customer care, service relationships, etc.

The authentication module 314 is software and routines for maintaining a list of authorized users and granting access to the MMR system 110. In one embodiment, the authentication module 314 maintains a list of user IDs and passwords corresponding to individuals who have created an account in the system 100b, and therefore, are authorized to use MMR gateway 104 and the MMR matching unit 106 to process retrieval requests. The authentication module 314 is communicatively coupled by signal line 330 to the server 302. But as the server 302 receives retrieval requests they can be processed and compared against information in the authentication module 314 before generating and sending the corresponding image query on signal line 134. In one embodiment, the authentication module 314 also generates messages for the server 302 to return to the mobile device 102 instances when the mobile device is not authorized, the mobile device has not established an account, or the account for the mobile device 102 is locked such as due to abuse or lack of payment.

The accounting module 316 is software and routines for performing accounting related to user accounts and use of the MMR system 100b. In one embodiment, the retrieval services are provided under a variety of different economic models such as but not limited to use of the MMR system 100b under a subscription model, a charge per retrieval request model or various other pricing models. In one embodiment, the MMR system 100b provides a variety of different pricing models and is similar to those currently offered for cell phones and data networks. The accounting module 316 is coupled to the server 302 by signal line 330 to receive an indication of any retrieval request received by the server 302. In one embodiment, the accounting module 316 maintains a record of transactions (retrieval request/recognition responses) processed by the server 302 for each mobile device 102. Although not shown, the accounting module 316 can be coupled to a traditional billing system for the generation of an electronic or paper bill.

The mail module 318 is software and routines for generating e-mail and other types of communication. The mail module 318 is coupled by signal at 330 to the server 302. In one embodiment, the mobile device 102 can issue retrieval requests that include a command to deliver a document or a portion of a document or other information via e-mail, facsimile or other traditional electronic communication means. The mail module 318 is adapted to generate and send such information from the MMR gateway 104 to an addressee as prescribed by the user. In one embodiment, each user profile has associated addressees which are potential recipients of information retrieved.

The analytics module 320 is software and routines for measuring the behavior of users of the MMR system 100b. The analytics module 320 is also software and routines for measuring the effectiveness and accuracy of feature extractors and recognition performed by the MMR matching unit 106. The analytics module 320 measures use of the MMR system 100b including which images are most frequently included as part of retrieval requests, which hotspot data is most often accessed, the order in which images are retrieved, the first image in the retrieval process, and other key performance indicators used to improve the MMR experience and/or a marketing campaign's audience response. In one embodiment, the analytics module 302 measures metrics of the MMR system 100b and analyzes the metrics used to measure the effectiveness of hotspots and hotspot data. The analytics module 320 is coupled to the server 302, the authentication module 314 and the accounting module 316 by signal line 330. The analytics module 320 is also coupled by the server 302 to signal line 134 and thus can access the components of the MMR matching unit 106 to retrieve recognition parameter, images features, quality recognition scores and any other information generated or use by the MMR matching unit 106. The analytics module 320 can also perform a variety of data retrieval and segmentation based upon parameters or criteria of users, mobile devices 102, page IDs, locations, etc.

In one embodiment, the MMR gateway 104 also includes a hotspot database 404. The hotspot database 404 is shown in FIG. 3 with dashed lines to reflect that inclusion in the MMR gateway 104 is an alternate embodiment. The hotspot database 404 is coupled by signal line 436 to receive the recognition responses via line 134. The hotspot database 404 uses these recognition responses to query the database and output via line 432 the hotspot content corresponding to the recognition responses. This hotspot content is sent to the server 302 so that it can be included with the recognition responses and sent to the requesting mobile device 102.

MMR Matching Unit 106

Figure 4A:
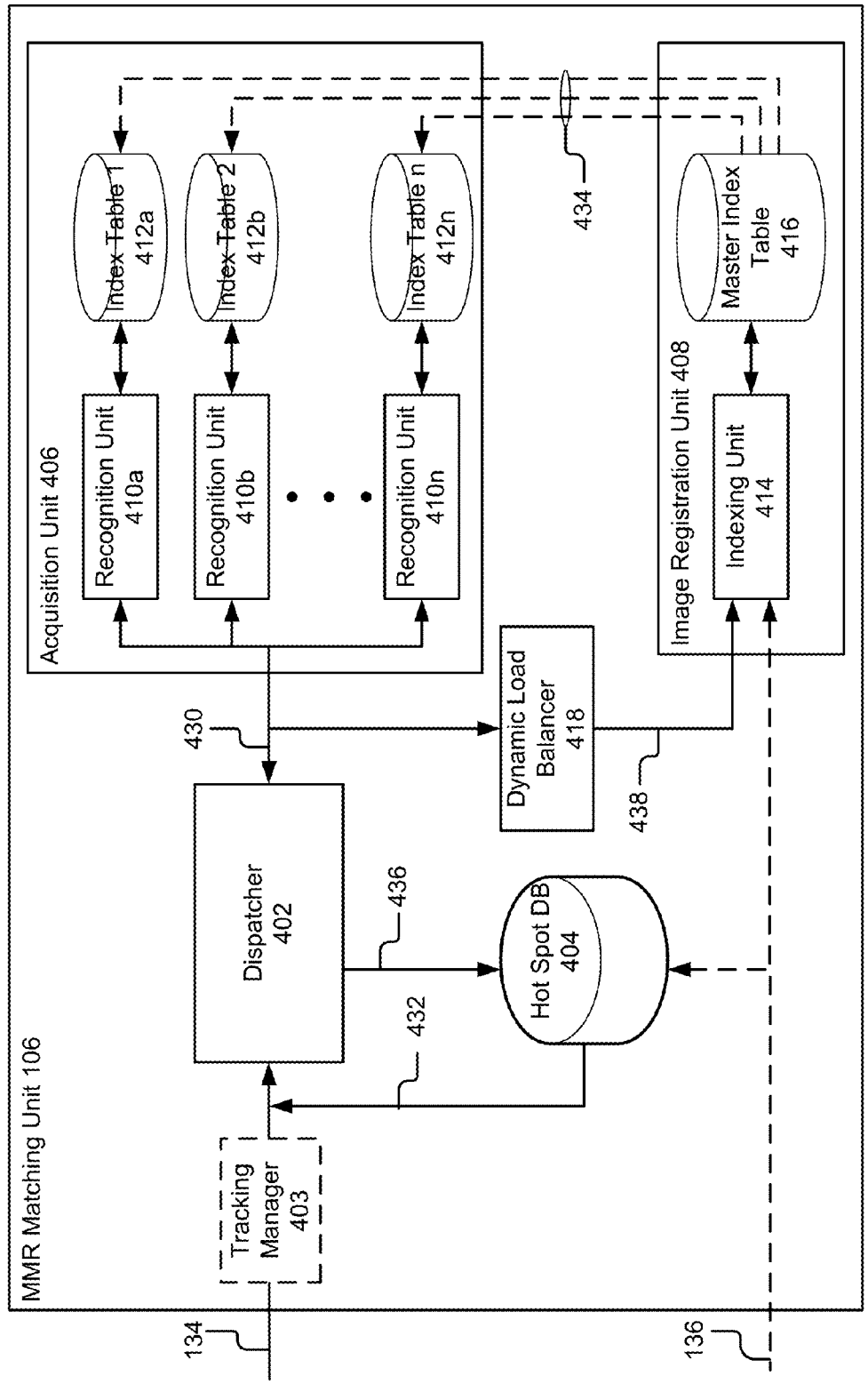
FIG. 4A is a block diagram of a first embodiment of a MMR matching unit.
Figure 4B:
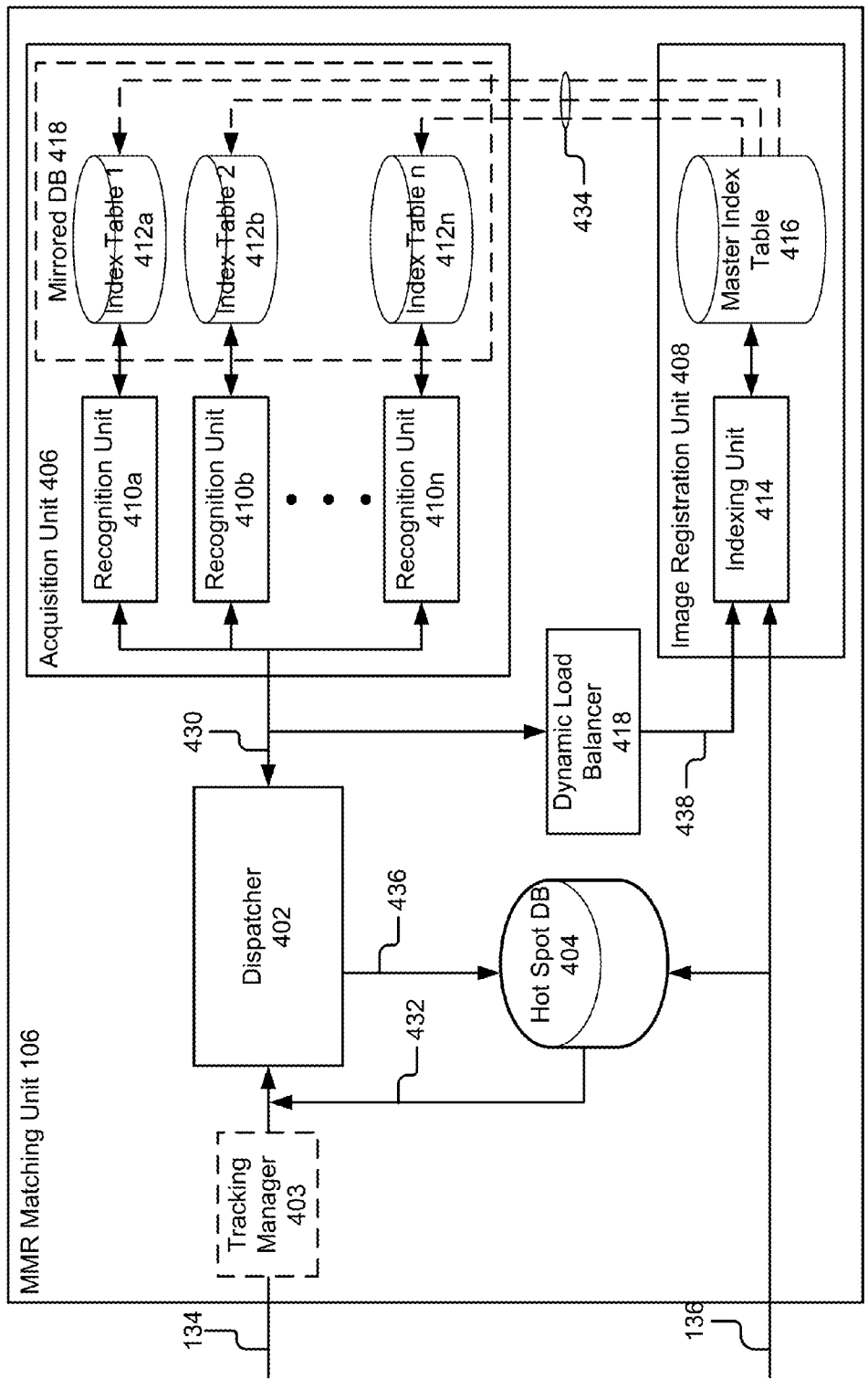
FIG. 4B is a block diagram of a second embodiment of the MMR matching unit.

Referring now to FIGS. 4A and 4B, two embodiments for the MMR matching unit 106 will be described. The basic function of the MMR matching unit 106 is to receive an image query, send the image query for recognition, perform recognition on the images in the image query, retrieve hotspot information, combine the recognition result with hotspot information, and send it back to the pre-processing server 103 or MMR gateway 104.

FIG. 4A illustrates a first embodiment of the MMR matching unit 106. The first embodiment of the MMR matching unit 106 comprises a dispatcher 402, a tracking manager 403, a hotspot database 404, an acquisition unit 406, an image registration unit 408, and a dynamic load balancer 418. The acquisition unit 406 further comprises a plurality of the recognition units 410a-410n and a plurality of index tables 412a-412n. The image registration unit 408 further comprises an indexing unit 414 and a master index table 416.

The dispatcher 402 is coupled to signal line 134 for receiving an image query from and sending recognition results to the pre-processing server 103 or MMR gateway 104. The dispatcher 402 is responsible for assigning and sending an image query to respective recognition units 410a-410n. In one embodiment, the dispatcher 402 receives an image query, generates a recognition unit identification number, and sends the recognition unit identification number and the image query to the acquisition unit 406 for further processing. The dispatcher 402 is coupled to signal line 430 to send the recognition unit identification number and the image query to the recognition units 410a-410n. The dispatcher 402 also receives the recognition results from the acquisition unit 406 via signal line 430. One embodiment for the dispatcher 402 will be described in more detail below with reference to FIG. 5.

The tracking manager 403 provides image tracking information to the pre-processing server 103 or MMR gateway 104 and MMR matching unit 106 for use during the image recognition process. The tracking manager 403 also may combine images or sets of features from images, produce image tracking information, and update image tracking information. The tracking manager 403 may perform each of these functions as a whole or some or all of them may be performed by an image tracker 240, as described in conjunction with FIG. 2B. Possible distributions of these functions between the image tracker 240 and the tracking manager 403 are described in conjunction with FIGS. 2C-2H. When the tracking manager 403 performs at least some of these functions, the image tracker 240 also may provide information regarding how images can be combined, e.g., relative timing of when images were received. In addition, the tracking manager 403 provides some post-recognition tracking-related processing. For example, the tracking manager 403 may verify the tracking information by comparing received recognition results for image queries for which tracking information is known. In addition, the tracking manager 403 may receive a recognition result that requires editing in some way, e.g., cropped to correspond to scanned portions of a document page.

An alternate embodiment for the hotspot database 404 has been described above with reference to FIGS. 3A-3B wherein the hotspot database is part of the pre-processing server 103 or MMR gateway 104. However, the preferred embodiment for the hotspot database 404 is part of the MMR matching unit 106 as shown in FIG. 4A. Regardless of the embodiment, the hotspot database 404 has a similar functionality. The hotspot database 404 is used to store hotspot information. Once an image query has been recognized and recognition results are produced, these recognition results are used as part of a query of the hotspot database 404 to retrieve hotspot information associated with the recognition results. The retrieved hotspot information is then output on signal line 134 to the pre-processing server 103 or MMR gateway 104 for packaging and delivery to the mobile device 102. As shown in FIG. 4A, the hotspot database 404 is coupled to the dispatcher 402 by signal line 436 to receive queries including recognition results. The hotspot database 404 is also coupled by signal line 432 and signal line 134 to the pre-processing server 103 or MMR gateway 104 for delivery of query results. The hotspot database 404 is also coupled to signal line 136 to receive new hotspot information for storage from the MMR publisher 108, according to one embodiment.

The acquisition unit 406 comprises the plurality of the recognition units 410*a*-410*n* and a plurality of index tables 412*a*-412*n*. Each of the recognition units 410*a*-410*n* has and is coupled to a corresponding index table 412*a*-412*n*. In one embodiment, each recognition unit 410/index table 412 pair is on the same server. The dispatcher 402 sends the image query to one or more recognition units 410*a*-410*n*. In one embodiment that includes redundancy, the image query is sent from the dispatcher 402 to a plurality of recognition units 410 for recognition and retrieval and the index tables 412*a*-*n* index the same data. In the serial embodiment, the image query is sent from the dispatcher 402 to a first recognition unit 410*a*. If recognition is not successful on the first recognition unit 410*a*, the image query is passed on to a second recognition unit 410*b*, and so on. In yet another embodiment, the dispatcher 402 performs some preliminary analysis of the image query and then selects a recognition unit 410*a*-410*n* best adapted and most likely to be successful at recognizing the image query. Those skilled in the art will understand that there are a variety of configurations for the plurality of recognition units 410*a*-410*n* and the plurality of index tables 412*a*-412*n*. Example embodiments for the acquisition unit 406 will be described in more detail below with reference to FIGS. 6A-6B. It should be understood that the index tables 412*a*-412*n* can be updated at various times as depicted by the dashed lines 434 from the master index table 416.

The image registration unit 408 comprises the indexing unit 414 and the master index table 416. The image registration unit 408 has an input coupled to signal on 136 to receive updated information from the MMR publisher 108, according to one embodiment, and an input coupled to signal line 438 to receive updated information from the dynamic load balancer 418. The image registration unit 408 is responsible for maintaining the master index table 416 and migrating all or portions of the master index table 416 to the index tables 412*a*-412*n* (slave tables) of the acquisition unit 406. In one embodiment, the indexing unit 414 receives images, unique page IDs, and other information; and converts it into index table information that is stored in the master index table 416. In one embodiment, the master index table 416 also stores the record of what is migrated to the index table 412. The indexing unit 414 also cooperates with the MMR publisher 108 according to one embodiment to maintain a unique page identification numbering system that is consistent across image pages generated by the MMR publisher 108, the image pages stored in the master index table 416, and the page numbers used in referencing data in the hotspot database 404.

One embodiment for the image registration unit 408 is shown and described in more detail below with reference to FIG. 7.

The dynamic load balancer 418 has an input coupled to signal line 430 to receive the query image from the dispatcher 402 and the corresponding recognition results from the acquisition unit 406. The output of the dynamic load balancer 418 is coupled by signal line 438 to an input of the image registration unit 408. The dynamic load balancer 418 provides input to the image registration unit 408 that is used to dynamically adjust the index tables 412*a*-412*n* of the acquisition unit 406. In particular, the dynamic load balancer 418 monitors and evaluates the image queries that are sent from the dispatcher 402 to the acquisition unit 406 for a given period of time. Based on the usage, the dynamic load balancer 418 provides input to adjust the index tables 412*a*-412*n*. For example, the dynamic load balancer 418 may measure the image queries for a day. Based on the measured usage for that day, the index tables may be modified and configured in the acquisition unit 406 to match the usage measured by the dynamic load balancer 418.

FIG. 4B illustrates a second embodiment of the MMR matching unit 106. In the second embodiment, many of the components of the MMR matching unit 106 have the same or a similar function to corresponding elements of the first embodiment. Thus, like reference numbers have been used to refer to like components with the same or similar functionality. The second embodiment of the MMR matching unit 106 includes the dispatcher 402, the hotspot database 404, and the dynamic load balancer 418 similar to the first embodiment of the MMR matching unit 106. However, the acquisition unit 406 and the image registration unit 408 are different than that described above with reference to FIG. 4A. In particular, the acquisition unit 406 and the image registration unit 408 utilize a shared SQL database for the index tables and the master table. More specifically, there is the master index table 416 and a mirrored database 418 that includes the local index tables 412*a*-*n*. Moreover, a conventional functionality of SQL database replication is used to generate the mirror images of the master index table 416 stored in the index tables 412*a*-412*n* for use in recognition. The image registration unit 408 is configured so that when new images are added to the master index table 416 they are immediately available to all the recognition units 410. This is done by mirroring the master index table 416 across all the local index tables 412a-n using large RAM (not shown) and database mirroring technology.

Dispatcher 402

Figure 5:
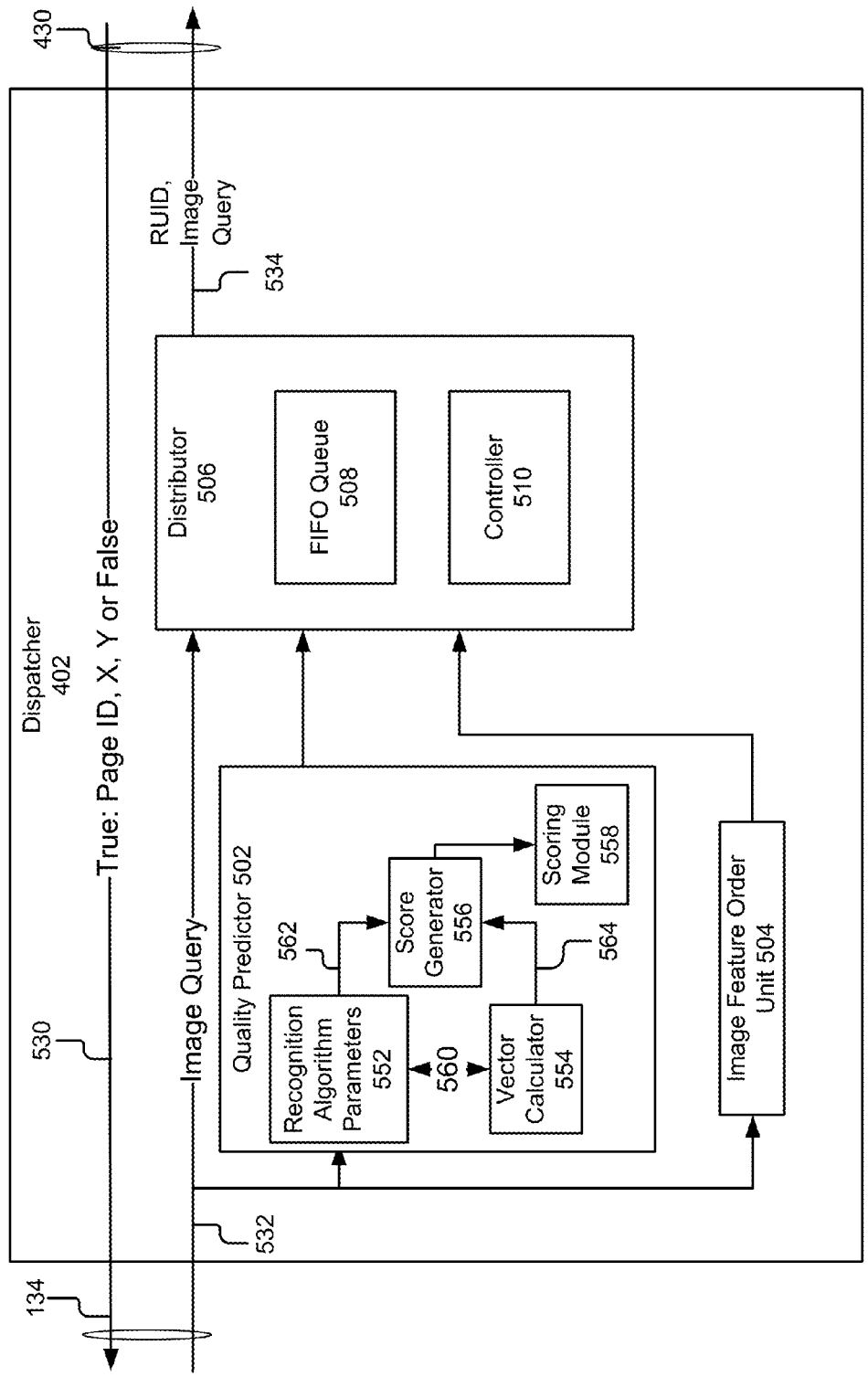
FIG. 5 is a block diagram of an embodiment of a dispatcher.

Referring now to FIG. 5, an embodiment of the dispatcher 402 shown. The dispatcher 402 comprises a quality predictor 502, an image feature order unit 504, and a distributor 506. The quality predictor 502, the image feature order unit 504, and the distributor 506 are coupled to signal line 532 to receive image queries from the pre-processing server 103 or MMR gateway 104.

The quality predictor 502 receives image queries and generates a recognizability score used by the dispatcher 402 to route the image query to one of the plurality of recognition units 410. The dispatcher 402 also receives recognition results from the recognition units 410 on signal line 530. The recognition results include a Boolean value (true/false) and if true, a page ID, and a location on the page. In one embodiment, the dispatcher 402 merely receives and retransmits the data to the pre-processing server 103 or MMR gateway 104.

One embodiment of the quality predictor 502 comprises recognition algorithm parameters 552, a vector calculator 554, a score generator 556 and a scoring module 558. The quality predictor 502 has inputs coupled to signal line 532 to receive an image query, context and metadata, and device parameters. The image query may be video frames, a single frame, or image features. The context and metadata includes time, date, location, environmental conditions, etc. The device parameters include brand, type, macro block on/off, gyro or accelerometer reading, aperture, time, exposure, flash, etc. Additionally, the quality predictor 502 uses certain parameters of the recognition algorithm parameters 552. These recognition algorithm parameters 552 can be provided to the quality predictor 502 from the acquisition unit 406 or the image registration unit 408. The vector calculator 554 computes quality feature vectors from the image to measure its content and distortion, such as its blurriness, existence and amount of recognizable features, luminosity, etc. The vector calculator 554 computes any number of quality feature vectors from one to n. In some cases, the vector calculator 554 requires knowledge of the recognition algorithm(s) to be used, and the vector calculator 554 is coupled by signal line 560 to the recognition algorithm parameters 552. For example, if an Invisible Junctions algorithm is employed, the vector calculator 554 computes how many junction points present in the image as a measure of its recognizability. All or some of these computed features are then input to score generator 556 via signal line 564. The score generator 556 is also coupled by signal line 562 to receive the recognition algorithm parameters 552. The output of the score generator 556 is provided to the scoring module 558. The scoring module 558 generates a recognition score using the recognition scores provided by the score generator 556 and applies weights to those scores. In one embodiment, the result is a single recognizability score. In another embodiment, the result is a plurality of recognizability scores ranked from highest to lowest.

The image feature order unit 504 receives image queries and outputs an ordering signal. The image feature order unit 504 analyzes an input image query and predicts the time required to recognize an image by analyzing the image features it contains. The difference between the actual recognition time and the predicted time is used to adjust future predictions thereby improving accuracy. In the simplest of embodiments, simple images with few features are assigned to lightly loaded recognition units 410 so that they will be recognize quickly and the user will see the answer immediately. In one embodiment, the features used by the image order feature unit 504 to predict the time are different than the features used by recognition units 410 for actual recognition. For example, the number of corners detected in an image is used to predict the time required to analyze the image. The feature set used for prediction need only be correlated with the actual recognition time. In one embodiment, several different features sets are used and the correlations to recognition time measured over some period. Eventually, the feature set that is the best predictor and lowest cost (most efficient) would be determined and the other feature sets could be discarded.

The distributor 506 is also coupled to receive the output of the quality predictor 502 and image feature order unit 504. The distributor 506 includes a FIFO queue 508 and a controller 510. The distributor 506 generates an output on signal line 534 that includes the image query and a recognition unit identification number (RUID). Those skilled in the art will understand that in other embodiments the image query may be directed to any particular recognition unit using a variety of means other than the RUID. As image queries are received on the signal line 532, the distributor 506 receives the image queries and places them in the order in which they are received into the FIFO queue 508. The controller 510 receives a recognizability score for each image query from the quality predictor 502 and also receives an ordering signal from the image feature order unit 504. Using this information from the quality predictor 502 and the image feature order unit 504, the controller 510 selects image queries from the FIFO queue 508, assigns them to particular recognition units 410 and sends the image query to the assigned recognition unit 410 for processing. The controller 510 maintains a list of image queries assigned to each recognition unit 410 and the expected time to completion for each image (as predicted by the image feature order unit 504). The total expected time to empty the queue for each recognition unit 410 is the sum of the expected times for the images assigned to it. The controller 510 can execute several queue management strategies. In a simple assignment strategy, image queries are removed from the FIFO queue 508 in the order they arrived and assigned to the first available recognition unit 410. In a balanced response strategy, the total expected response time to each query is maintained at a uniform level and query images are removed from the FIFO queue 508 in the order they arrived, and assigned to the FIFO queue 508 for a recognition unit so that its total expected response time is as close as possible to the other recognition units. In an easy-first strategy, images are removed from the FIFO queue 508 in an order determined by their expected completion times—images with the smallest expected completion times are assigned to the first available recognition unit. In this way, users are rewarded with faster response time when they submit an image that's easy to recognize. This could incentivize users to carefully select the images they submit. Other queue management strategies are possible.

Acquisition Unit 406

Figure 6A:
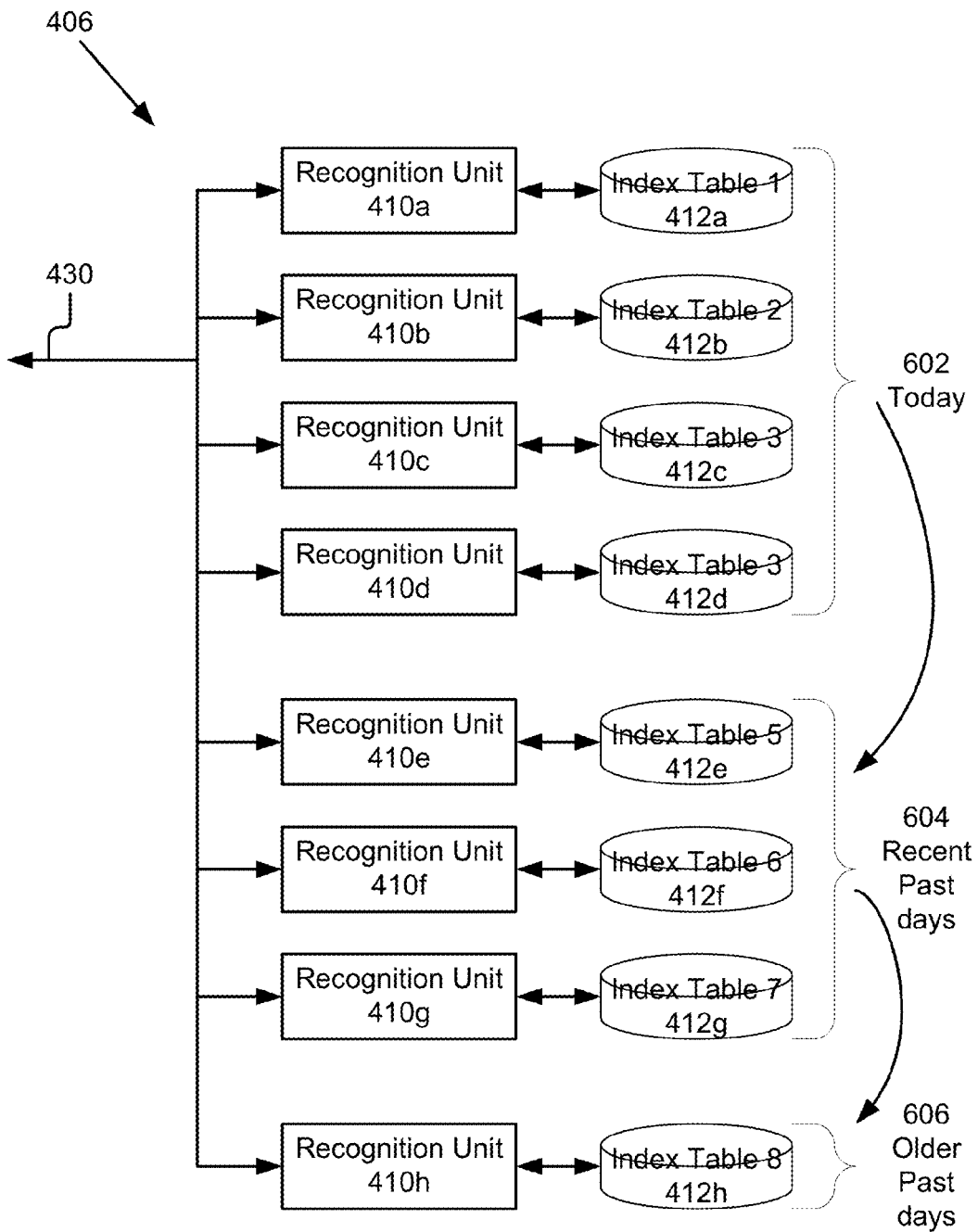
FIG. 6A is a block diagram of a first embodiment of an image retrieval unit.
Figure 6B:
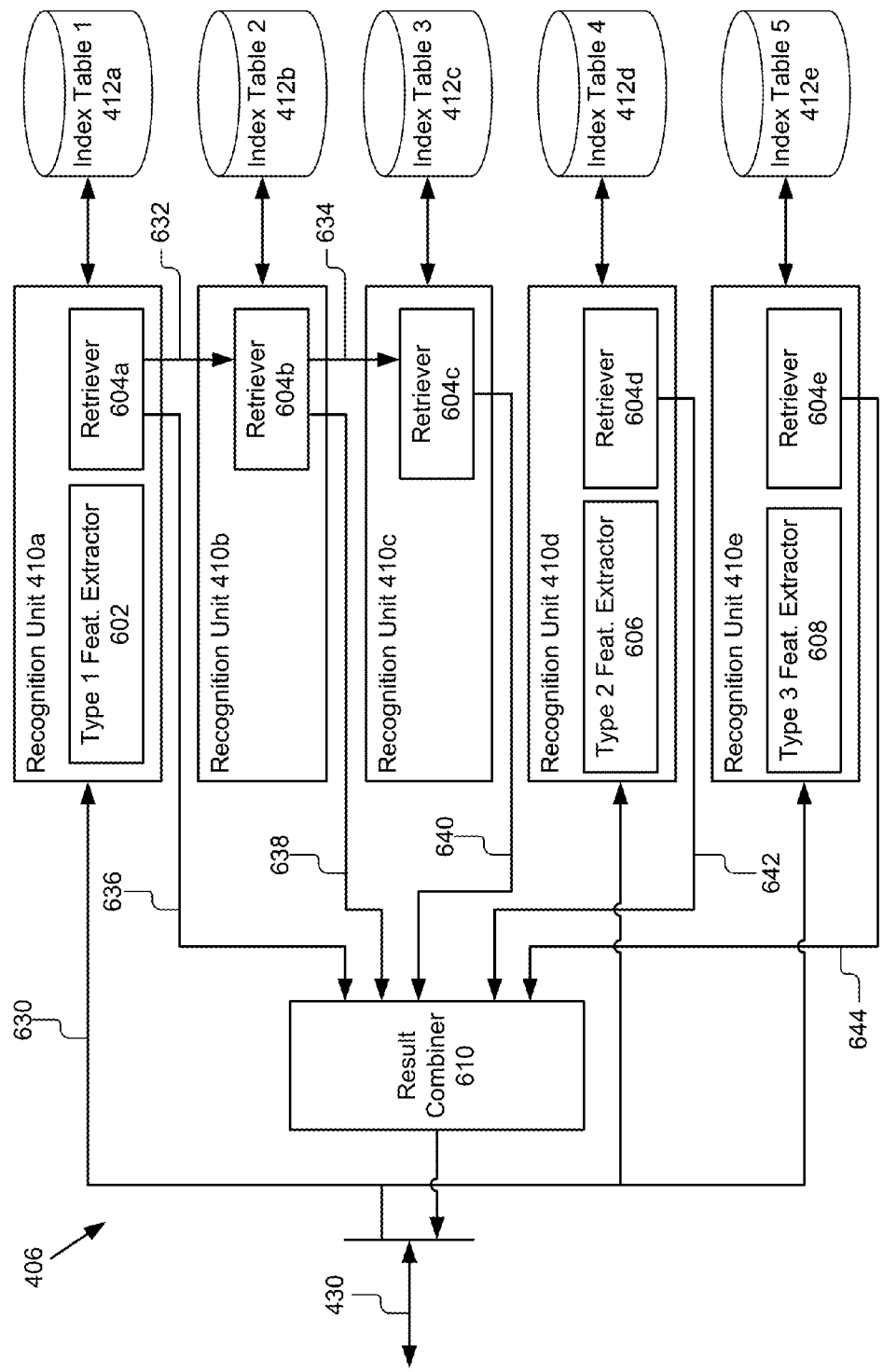
FIG. 6B is a block diagram of a second embodiment of the image retrieval unit.

Referring now to FIGS. 6A and 6B, embodiments of the acquisition unit 406 will be described.

FIG. 6A illustrates one embodiment for the acquisition unit 406 where the recognition unit 410 and index table 412 pairs are partitioned based on the content or images that they index. This configuration is particularly advantageous for mass media publishers that provide content on a periodic basis. The organization of the content in the index tables 412 can be partitioned such that the content most likely to be accessed will be available on the greatest number of recognition unit 410 and index table 412 pairs. Those skilled in the art will recognize that the partition described below is merely one example and that various other partitions based on actual usage statistics measured over time can be employed. As shown in FIG. 6A, the acquisition unit 406 comprises a plurality of recognition units 410a-h and a plurality of index tables 412a-h. The plurality of recognition units 410a-h is coupled to signal line 430 to receive image queries from the dispatcher 402. Each of the plurality of recognition units 410a-h is coupled to a corresponding index table 412a-h. The recognition units 410 extract features from the image query and compare those image features to the features stored in the index table to identify a matching page and location on that page.

Example recognition and retrieval systems and methods are disclosed in U.S. patent application Ser. No. 11/461,017, titled "System And Methods For Creation And Use Of A Mixed Media Environment," filed Jul. 31, 2006; U.S. patent application Ser. No. 11/461,279, titled "Method And System For Image Matching In A Mixed Media Environment," filed Jul. 31, 2006; U.S. patent application Ser. No. 11/461,286, titled "Method And System For Document Fingerprinting Matching In A Mixed Media Environment," filed Jul. 31, 2006; U.S. patent application Ser. No. 11/461,294, titled "Method And System For Position-Based Image Matching In A Mixed Media Environment," filed Jul. 31, 2006; U.S. patent application Ser. No. 11/461,300, titled "Method And System For Multi-Tier Image Matching In A Mixed Media Environment," filed Jul. 31, 2006; U.S. patent application Ser. No. 11/461,147, titled "Data Organization and Access for Mixed Media Document System," filed Jul. 31, 2006; U.S. patent application Ser. No. 11/461,164, titled "Database for Mixed Media Document System," filed Jul. 31, 2006; U.S. patent application Ser. No. 11/461,109, titled "Searching Media Content For Objects Specified Using Identifiers," filed Jul. 31, 2006; U.S. patent application Ser. No. 12/059,583, titled "Invisible Junction Feature Recognition For Document Security Or Annotation," filed Mar. 31, 2008; U.S. patent application Ser. No. 12/121,275, titled "Web-Based Content Detection In Images, Extraction And Recognition," filed May 15, 2008; U.S. patent application Ser. No. 11/776,510, titled "Invisible Junction Features For Patch Recognition," filed Jul. 11, 2007; U.S. patent application Ser. No. 11/776,520, titled "Information Retrieval Using Invisible Junctions and Geometric Constraints," filed Jul. 11, 2007; U.S. patent application Ser. No. 11/776,530, titled "Recognition And Tracking Using Invisible Junctions," filed Jul. 11, 2007; and U.S. patent application Ser. No. 11/777,142, titled "Retrieving Documents By Converting Them to Synthetic Text," filed Jul. 12, 2007; and U.S. patent application Ser. No. 11/624,466, titled "Synthetic Image and Video Generation From Ground Truth Data," filed Jan. 18, 2007; which are incorporated by reference in their entirety.

As shown in FIG. 6A, the recognition unit 410/index table 412 pairs are hierarchical, and grouped according to the content that in the index tables 412. In particular, the first group 602 of recognition units 410a-d and index tables 412a-d is used to index the pages of a publication such as a newspaper for a current day according to one embodiment. For example, four of the eight recognition units 410 are used to index content from the current day's newspaper because most of the retrieval requests are likely to be related to the newspaper that was published in the last 24 hours. A second group 604 of recognition units 410e-g and corresponding index tables 412e-g are used to store pages of the newspaper from recent past days, for example the past week. A third group 606 of recognition unit 410h and index table 412h is used to store pages of the newspaper from older past days, for example for the past year. This allows the organizational structure of the acquisition unit 406 to be optimized to match the profile of retrieval requests received. Moreover, the operation of the acquisition unit 406 can be modified such that a given image query is first sent to the first group 602 for recognition, and if the first group 602 is unable to recognize the image query, it is sent to the second group 604 for recognition and so on.

It should be noted that the use of four recognition units 410 and index tables 412 as the first group 602 is merely by way of example and used to demonstrate a relative proportion as compared with the number of recognition units 410 and index tables 412 in the second group 604 and the third group 606. The number of recognition units 410 and index tables 412 in any particular group 602, 604 and 606 may be modified based on the total number of recognition units 410 and index tables 412. Furthermore, the number of recognition units 410 and index tables 412 in any particular group 602, 604, and 606 may be adapted so that it matches the profile of all users sending retrieval request to the acquisition unit 406 for a given publication.

Alternatively, the recognition unit 410 and index tables 412 pairs may be partitioned such that there is overlap in the documents they index, e.g., such as segments of a single image according to content type. In this example, image queries are sent to index tables 412 in parallel rather than serially.

FIG. 6B illustrates a second embodiment for the acquisition unit 406 where the recognition units 410 and index tables 412 are partitioned based upon the type of recognition algorithm they implement. In the second embodiment, the recognition units 410 are also coupled such that the failure of a particular recognition unit to generate a registration result causes the input image query to be sent to another recognition unit for processing. Furthermore, in the second embodiment, the index tables 412 include feature sets that are varied according to different device and environmental factors of image capture devices (e.g., blur, etc.).

The second embodiment of the acquisition unit 406 includes a plurality of recognition units 410a-410e, a plurality of the index tables 412a-412e and a result combiner 610. In this embodiment, the recognition units 410a-410e each utilizes a different type of recognition algorithm. For example, recognition units 410a, 410b, and 410c use a first recognition algorithm; recognition unit 410d uses a second recognition algorithm; and recognition unit 410e uses a third recognition algorithm for recognition and retrieval of page numbers and locations. Recognition units 410a, 410d, and 410e each have an input coupled signal line 430 by signal line 630 for receiving the image query. The recognition results from each of the plurality of recognition units 410a-410e are sent via signal lines 636, 638, 640, 642, and 644 to the result combiner 610. The output of the result combiner 610 is coupled to signal line 430.

In one embodiment, the recognition units 410a, 410b, and 410c cooperate together with index tables 1, 2, and 3, 412a-412c each storing image features corresponding to the same pages but with various modifications, e.g., due to different device and environmental factors. For example, index table 1 412a may store images features for pristine images of pages such as from a PDF document, while index table 2 412b stores images of the same pages but with a first level of modification, and index table 3 412c stores images of the same pages but with a second level of modification. In one embodiment, the index tables 1, 2, and 3, 412*a*-412*c* are quantization trees. The first recognition unit 410*a* receives the image query via signal line 630. The first recognition unit 410*a* comprises a first type of feature extractor 602 and a retriever 604*a*. The first type of feature extractor 602 receives the image query, extracts the Type 1 features, and provides them to the retriever 604*a*. The retriever 604*a* uses the extracted Type 1 features and compares them to the index table 1 412*a*. If the retriever 604*a* identifies a match, the retriever 604*a* sends the recognition results via signal line 636 to the result combiner 610. If however, the retriever 604*a* was unable to identify a match or identifies a match with low confidence, the retriever 604*a* sends the extracted Type 1 features to the retriever 604*b* of the second recognition unit 410*b* via signal line 632. It should be noted that since the Type 1 features already have been extracted, the second recognition unit 410*b* does not require a feature extractor 602. The second recognition unit 410*b* performs retrieval functions similar to the first recognition unit 410*a*, but cooperates with index table 2 412*b* that has Type 1 features for slightly modified images. If the retriever 604*b* identifies a match, the retriever 604*b* sends the recognition results via signal line 638 to the result combiner 610. If the retriever 604*b* of the second recognition unit 410*b* is unable to identify a match or identifies a match with low confidence, the retriever 604*b* sends the extracted features to the retriever 604*c* of the third recognition unit 410*b* via modification are provided, this is only by way of example and that any number of additional levels of modification from 0 to n may be used.

The recognition units 410*d* and 410*e* operate in parallel with the other recognition units 410*a*-*c*. The fourth recognition unit 410*d* comprises a second type of feature extractor 606 and a retriever 604*d*. The Type 2 feature extractor 606 received the image query and bounding boxes or other feature identifiers, parses the bounding boxes or other feature identifiers, and generates Type 2 coding features. These Type 2 features are provided to the retriever 604*d* and the retriever 604*d* compares them to the features stored in index table 4 412*d*. In one embodiment, index table 4 412*d* is a hash table. The retriever 604*d* identifies any matching pages and returns the recognition results to the result combiner 610 via signal line 642. The fifth recognition unit 410*e* operates in a similar manner but for a third type of feature extraction. The fifth recognition unit 410*e* comprises a Type 3 feature extractor 608 and a retriever 604*e*. The Type 3 feature extractor 608 receives the image query and bounding boxes or other feature identifiers, parses the image and generates Type 3 features and the features that are provided to the retriever 604*e* and the retriever 604*e* compares them to features stored in the index table 5 412*e*. In one embodiment, the index table 5 412*e* is a SQL database of character strings. The retriever 604*e* identifies any matching strings and returns the recognition results to the result combiner 610 via signal line 644.

In one exemplary embodiment the three types of feature extraction include and invisible junction recognition algorithm, brick wall coding, and path coding.

The result combiner 610 receives recognition results from the plurality of recognition units 410*a*-*e* and produces one or a small list of matching results. In one embodiment, each of the recognition results includes an associated confidence factor. In another embodiment, context information such as date, time, location, personal profile, or retrieval history is provided to the result combiner 610. These confidence factors along with other information are used by the result combiner 610 to select the recognition results most likely to match the input image query.

The above described embodiments are not meant to be exclusive or limiting, and may be combined according to other embodiments. E.g., in other embodiments, the acquisition unit 406 has recognition unit 410 and index tables 412 pairs partitioned in different manners, e.g., into one or more higher priority indexed and one or more general indexes, include at least one recognition unit 410 and index table 412 pair partitioned by mobile device 102 user, indexes partitioned by geographical location, and/or partitioned such that a recognition unit 410 and index tables 412 pair is included on the mobile device 102.

Image Registration Unit 408

Figure 7:
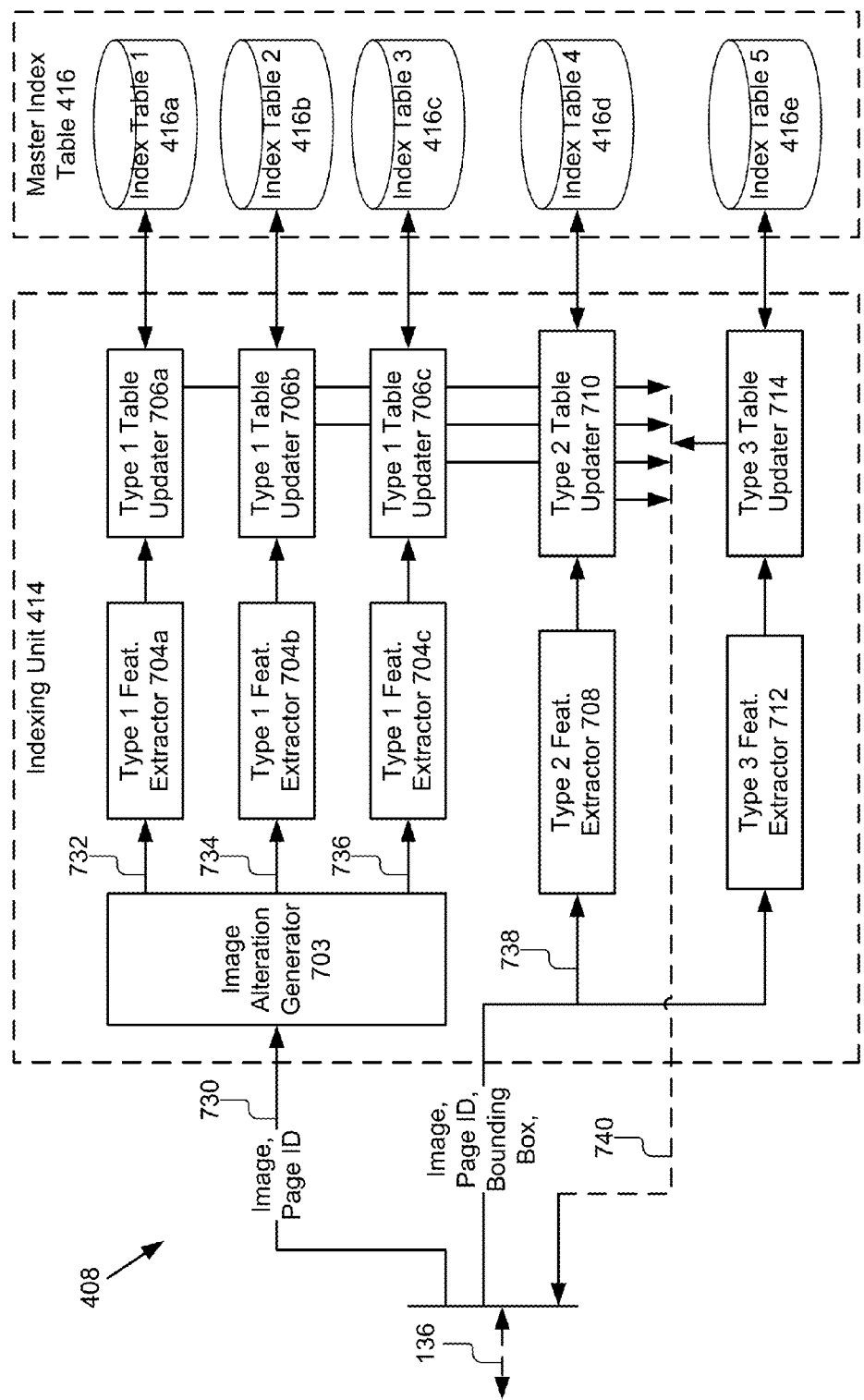
FIG. 7 is a block diagram of an embodiment of a registration unit.

FIG. 7 shows an embodiment of the image registration unit 408. The image registration unit 408 comprises an image alteration generator 703, a plurality of Type 1 feature extractors 704*a*-*c*, a plurality of Type 1 index table updaters 706*a*-*c*, a Type 2 feature extractor 708, a Type 2 index table updater 710, a Type 3 feature extractor 712, a Type 3 index table updater 714 and a plurality of master index tables 416*a*-*e*. The image registration unit 408 also includes other control logic (not shown) that controls the updating of the working index tables 411-413 from the master index table 416. The image registration unit 408 can update the index tables 411-413 of the acquisition unit 406 in a variety of different ways based on various criteria such performing updates on a periodic basis, performing updates when new content is added, performing updates based on usage, performing updates for storage efficiency, etc.

The image alteration generator 703 has an input coupled in signal line 730 to receive an image and a page identification number. The image alteration generator 703 has a plurality of outputs and each output is coupled by signal lines 732, 734, and 736 to invisible Type 1 extractors 704*a*-*c*, respectively. The image alteration generator 703 passes a pristine image and the page identification number to the output and signal line 732. The image alteration generator 703 then generates a first altered image and outputs it and the page identification number on signal line 734 to Type 1 feature extractor 704*b*, and a second altered image, alter differently than the first altered image, and outputs it and page identification number on signal line 736 to Type 1 feature extractor 704*c*.

The Type 1 feature extractors 704 receive the image and page ID, extract the Type 1 features from the image and send them along with the page ID to a respective Type 1 index table updater 706. The outputs of the plurality of Type 1 feature extractors 704*a*-*c* are coupled to input of the plurality of Type 1 index table updaters 706*a*-*c*. For example, the output of Type 1 feature extractor 704*a* is coupled to an input of Type 1 index table updater 706*a*. The remaining Type 1 feature extractors 704*b*-*c* similarly are coupled to respective Type 1 index table updaters 706*b*-*c*. The Type 1 index table updaters 706 are responsible for formatting the extracted features and storing them in a corresponding master index table 416. While the master index table 416 is shown as five separate master index tables 416*a*-*e*, those skilled in the art will recognize that all the master index tables could be combined into a single master index table or into a few master index tables. In the embodiment including the MMR publisher 108, once the Type 1 index table updaters 706 have stored the extracted features in the index table 416, they issue a confirmation signal that is sent via signal lines 740 and 136 back to the MMR publisher 108.

The Type 2 feature extractor 708 and the Type 3 feature extractor 712 operate in a similar fashion and are coupled to signal line 738 to receive the image, a page identification number, and possibly other image information. The Type 2 feature extractor 708 extracts information from the input needed to update its associated index table 416$d$. The Type 2 index table updater 710 receives the extracted information from the Type 2 feature extractor 708 and stores it in the index table 416$d$. The Type 3 feature extractor 712 and the Type 3 index table updater 714 operate in a like manner but for Type 3's feature extraction algorithm. The Type 3 feature extractor 712 also receives the image, a page number, and possibly other image information via signal line 738. The Type 3 feature extractor 712 extracts Type 3 information and passes it to the Type 3 index table updater 714. The Type 3 index table updater 714 stores the information in index table 5 416$e$. The architecture of the registration unit 408 is particularly advantageous because it provides an environment in which the index tables can be automatically updated, simply by providing images and page numbers to the image registration unit 408. According to one embodiment, Type 1 feature extraction is invisible junction recognition, Type 2 feature extraction is brick wall coding, and Type 3 feature extraction is path coding.

Methods

Figure 9:
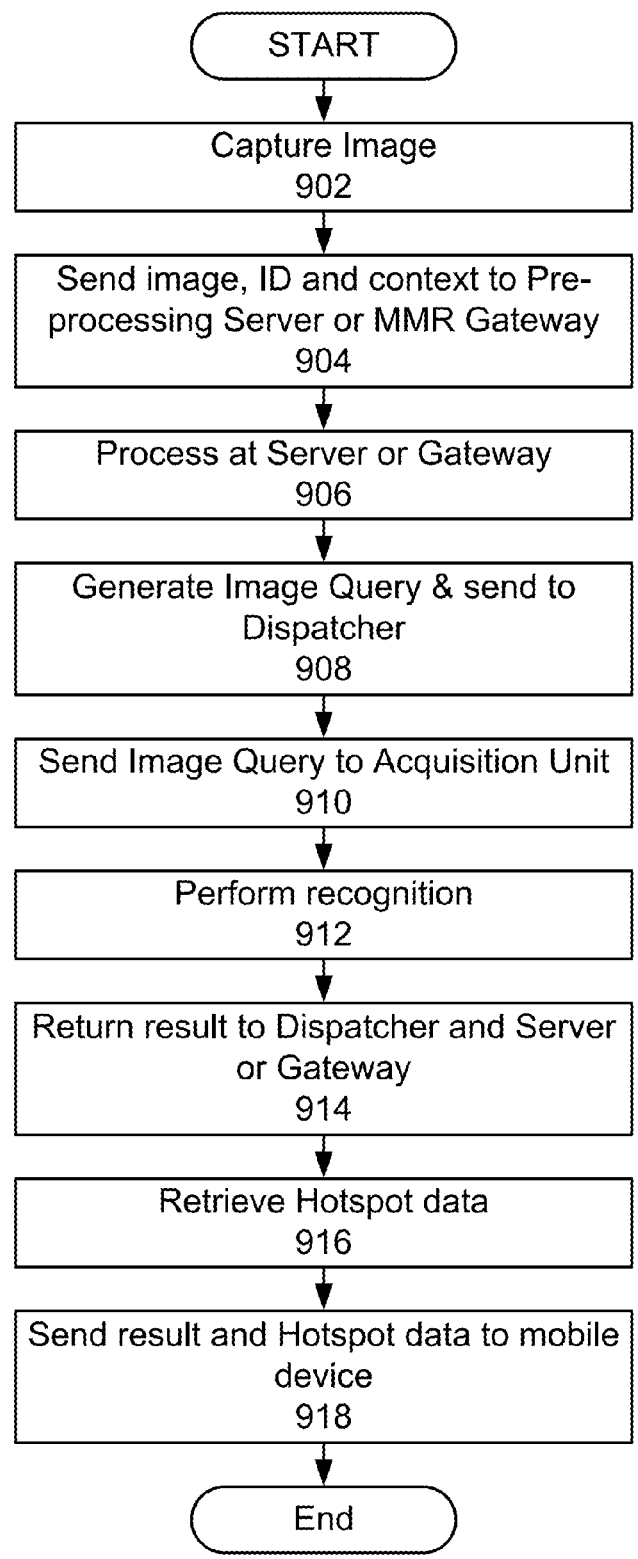
FIG. 9 is a flowchart of an example method for retrieving a document and location from an input image.

FIG. 9 is a flowchart of an example method for generating and sending a retrieval request and processing the retrieval request with an MMR system 100. The method begins with the mobile device 102 capturing 902 an image. A retrieval request that includes the image, a user identifier, and other context information is generated by the mobile device 102 and sent 904 to the pre-processing server 103 or MMR gateway 104. The pre-processing server 103 or MMR gateway 104 processes 906 the retrieval request by extracting the user identifier from the retrieval request and verifying that it is associated with a valid user. The pre-processing server 103 or MMR gateway 104 also performs other processing such as recording the retrieval request in the log 310, performing any necessary accounting associated with the retrieval request and analyzing any MMR analytics metrics. Next, the pre-processing server 103 or MMR gateway 104 generates 908 an image query and sends it to the dispatcher 402. The dispatcher 402 performs load-balancing and sends the image query to the acquisition unit 406. In one embodiment, the dispatcher 402 specifies the particular recognition unit 410 of the acquisition unit 406 that should process the image query. Then the acquisition unit 406 performs 912 image recognition to produce recognition results. The recognition results are returned 914 to the dispatcher 402 and in turn the pre-processing server 103 or MMR gateway 104. The recognition results are also used to retrieve 916 hotspot data corresponding to the page and location identified in the recognition results. Finally, the hotspot data and the recognition results are sent 918 from the pre-processing server 103 or MMR gateway 104 to the mobile device 102.

Image Tracking-Assisted MMR Recognition

Figure 10:
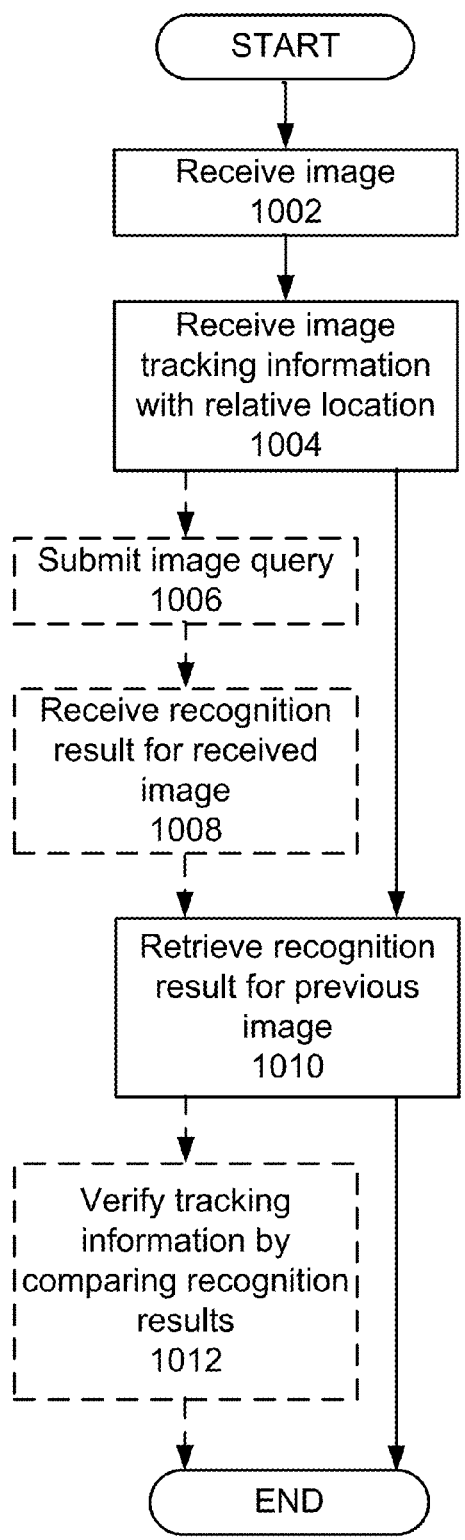
FIG. 10 is a flowchart of an example method of image tracking-assisted recognition.

In some instances, a mobile device 102 user will be interested in multiple pieces of information from the same document page. For example, a user may move his mobile device 102 over a document page and submit multiple images for recognition. FIG. 10 is a flowchart of an example method of image tracking-assisted recognition. The method is particularly advantageous because the addition of image tracking improves the accuracy and speed of MMR recognition. Specifically, using image tracking, e.g., via 240 and/or 403, on the video stream of the mobile device 102 allows for a determination of whether two frames exist on the same page, and if so the relative positions of the content of each. The method begins with receiving 1002 an image, e.g. as captured by mobile device 102. In addition, image tracking information is received 1004 indicating a location of the received image relative to a location associated with a previously received image for which recognition has been performed. For example, such image tracking information may be provided by image tracker 240, alone or in conjunction with tracking manager 403. The method then proceeds according to one of two different paths. In one embodiment, and image query is formed and submitted 1006 corresponding to the received image, and a recognition result is received 1008 associated with the image query for the received image. Then, the recognition result associated with the previously received image is retrieved 1010. In this example, the tracking information received is verified 1012 by comparing the two recognition results, e.g., by tracking manager 403. The process then ends for this path. This embodiment imparts additional accuracy to the process. Because more than one frame obtained from the same document page is submitted for recognition, even though the image tracking information indicates that they are from the same document page, the recognition results for the two images can be compared to the image tracking information for verification. For example, tracking information could be calculated from the respective recognition results, which, if inconsistent with the tracking information received from the image tracker 240, could be used to update the image tracker information.

According to another embodiment, after receiving 1004 the image tracking information, and in response to the image tracking information indicating that a document page includes the locations of both images, the previously received image recognition result is retrieved 1010. In this example, no image query is submitted corresponding to the received image, since the tracking has indicated the received images on the same page as the previously received image, and thus the recognition result is the same. Therefore, if the first (previous) received image was submitted for recognition, it is unnecessary to submit the second image.

Figure 11:
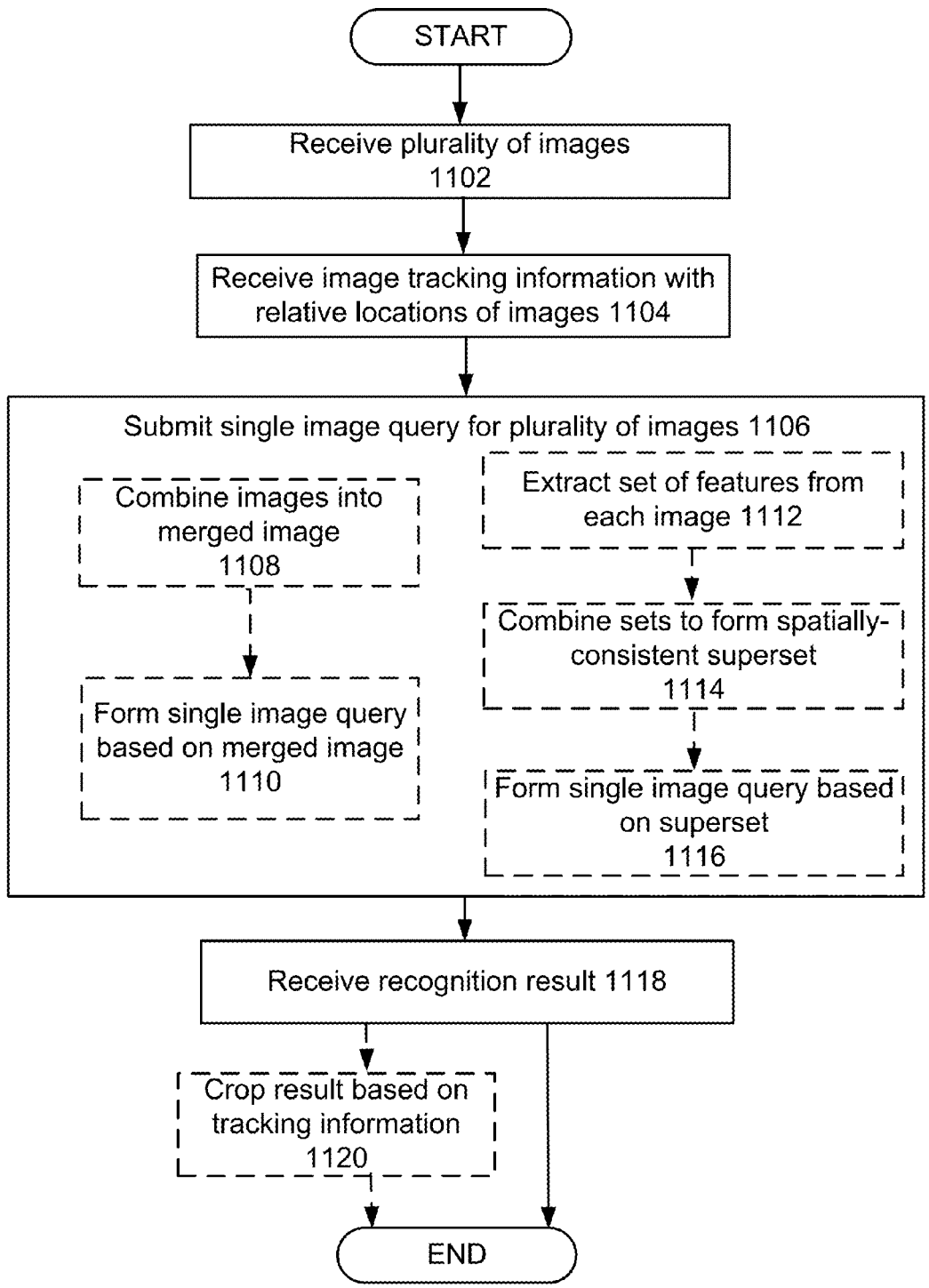
FIG. 11 is a flowchart showing an example method of recognition of a plurality of received images using a single image query.

FIG. 11 is a flowchart showing an example method of recognition of a plurality of received images using a single image query. The method begins with receiving 1102 a plurality of images, e.g., from a single document page, captured by mobile device 102. For example, the images may be taken from a video stream. In addition, image tracking information is received 1104 indicating relative locations of the received images on the document page, e.g., from image tracker 240, alone or in conjunction with tracking manager 403. The image tracking information also may include instructions for combining received images. From this information, a single image query is submitted 1106 for the plurality of images. This step 1106 includes additional sub-steps according to various embodiments. The received images are combined 1108 according to one embodiment to form a merged image, e.g., by image tracker 240 and/or tracking manager 403. Information regarding how the received images are to be combined may be received from an image tracker 240 on the mobile device 102 and/or a tracking manager 403. The merged image may include the combined image stitched together from the plurality of images, e.g. according to methods known in the art of creating panoramas. This method is advantageous because the merged image contains a larger area of the document, and thus provides more context, than any of the individual images received, resulting in improved recognition accuracy.

Figure 12A:
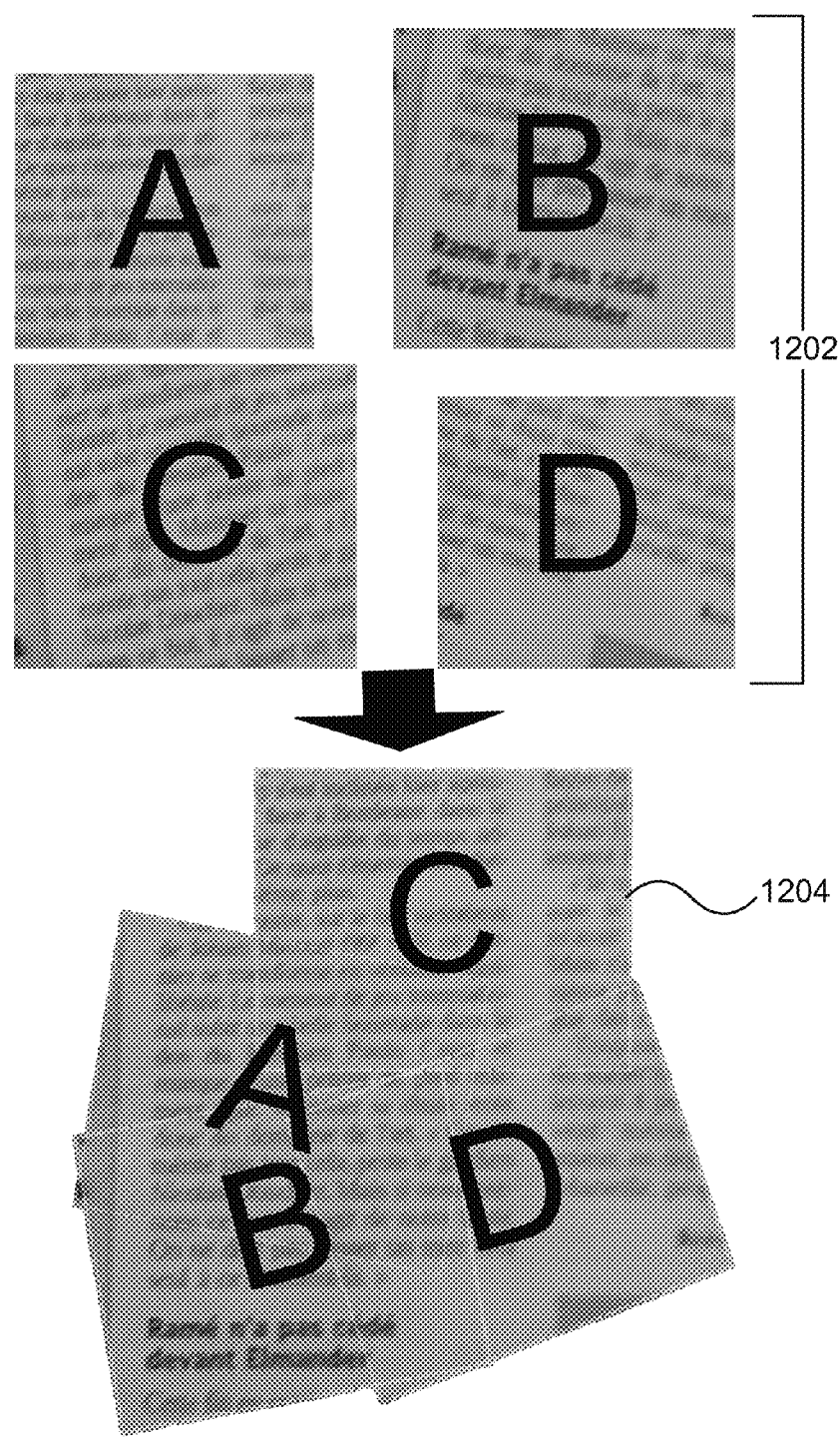
FIG. 12A shows conversion of four received images into a merged image according to the method shown in FIG. 11.

Alternatively, the merged image may be a super-resolution image synthesized from the combination of the plurality received images according to methods known in the art, e.g., performed by image tracker 240 and/or tracking manager 403. This method is advantageous because features extracted from the higher resolution merged image more closely resemble the features of the indexed high resolution image, thus improving recognition accuracy. In one embodiment, the merge 1108 may occur on the mobile device 102. In another embodiment, the merge 1108 occurs at the server (e.g., pre-processing server 103 or MMR gateway 104, or MMR matching unit 106). In this example, tracking information may be sent from the image tracker 240 on the mobile device 102, from a tracking manager 403 on the server 252 (e.g., using relative timing information received from the mobile device 102), or a combination of these. For example, the image tracker 240 on the mobile device 102 may provide sequence and timing information for a plurality of images, and the tracking manager 403 may provide the image tracking information as calculated therefrom. FIG. 12A shows an example of four received images 1202 and the merged image 1204 formed from the combination of the received images 1202 according to the method of FIG. 11. From the combined image, the single image query is formed 1110. That is, a synthetic patch is created by combining multiple image patches, upon which MMR recognition is performed.

Figure 12B:
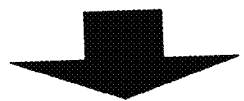
FIG. 12B shows a cropped high resolution image result according to a hand-held scanner functionality.
Figure 12B:

Alternatively, multiple images received can be used to provide recognition results without combining them into a single image. Thus, according to another embodiment, a set of features is extracted 1112 from each of the plurality of images. The sets of features then are combined 1114 to form a single spatially-consistent superset, e.g., by image tracker 240 and/or tracking manager 403. From the superset, the single image query is formed 1116. Features in overlapping portions of the images that are not reliable may be removed prior submission 1106 of the query. In addition, for multiple images received for a single location, features for the same location on a document page may be used to compute a set of consensus features that provide greater accuracy, and feature sets that are inconsistent with the consensus features may be excluded from the superset. The combined features can be processed in a single image query because the positions of the images relative to each other, as well as their rotation and scale relative to each other are known. In this example, no overlap between the images is needed. In one embodiment, the process ends when a recognition result is received 1118 based upon the single image query, which is then provided to the mobile device 102. In another embodiment, the mobile device 102 can act as a hand-held scanner, and thus when the recognition result is received 1118 corresponding to the single image query, the result may be cropped 1120, e.g., by tracking manager 403, based on the tracking information indicating the relative locations of the received images on the document page, such that a high resolution image is provided in the shape of the captured images, i.e., as if it had been scanned by the mobile device 102. FIG. 12B shows a cropped high resolution image 1406 resulting from the combination of received images 1202 according to a hand-held scanner functionality. In this example, the intersection points where the individual images come together can be computed using the sides of the polygons defined by the (x,y) values of the corners of the polygons.

MMR-Assisted Image Tracking

Just as image tracking can be used to improve MMR recognition results, MMR recognition performed periodically on a set of consecutive frames of video stream can improve image tracking Specifically, drift is a known problem with image tracking of long sequences due to the cumulative nature of camera motion estimation. See, e.g., Kuhn (2003), referenced above. Drift occurs as small errors that occur in the frame to frame motion estimation accumulate. FIG. 13 is a flowchart showing a method of improved image tracking using MMR. MMR recognition can be used to determine absolute camera position in parallel with image tracking to correct for the cumulative drift, resulting in virtually drift-free tracking for long sequences. The method begins with receiving 1302 an image, and receiving 1304 image tracking information indicating a location of the received image on a document page relative to a location of a previously received image on the document page, e.g., from image tracker 240. Using this information, an image query is then submitted 1306 corresponding to the received image. A recognition result is then received 1308 associated with the image query. From the result, and absolute location of the received image on the document page can be determined 1310, e.g., by tracking manager 403. Then, the tracking information can be updated 1312 to reflect the absolute location of the received image on the document page. In another embodiment, some but not all of the received images are submitted as image queries. In this embodiment, the absolute location is only updated for images that are submitted. In one embodiment, the method includes retrieving a recognition result for the previously received image, and from that result submitting the associated document ID, along with the image tracking information, as the image query, wherein the absolute location is returned as the result.

The forgoing description has been presented for the purposes of illustration and description. It is not intended to be exhaustive or to limit the techniques disclosed here to the precise form disclosed. Many modifications and variations are possible in light of the above teaching. As will be understood by those familiar with the art, the techniques disclosed here may be embodied in other specific forms without departing from the spirit or essential characteristics disclosed. Likewise, the particular naming and division of the modules, routines, features, attributes, methodologies and other aspects are not mandatory or significant, and the mechanisms that implement the techniques or their features may have different names, divisions and/or formats. Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the techniques disclosed here are in no way limited to implementation in any specific programming language, or for any specific operating system or environment. Accordingly, the disclosure is intended to be illustrative, but not limiting, of the scope of the present invention, which is set forth in the following claims.

What is claimed is:
1. A method comprising:
receiving a first image and a second image;

receiving image tracking information identifying a position, a rotation, and a scale of the first image relative to the second image, wherein the image tracking information includes sequence and relative timing information for the first image and the second image;

determining a first set of image features of the first image and a second set of image features of the second image;

combining the first set of image features and the second set of image features into a superset of image features using the image tracking information including the position, the rotation and the scale of the first image relative to the second image;

forming a single image query corresponding to the first image and the second image based on the superset of image features;

submitting the single image query corresponding to the first image and the second image; and receiving a recognition result matching the single image query.

2. The method of claim 1, wherein the image tracking information comprises instructions for the combining.

3. The method of claim 1, further comprising:
combining the first image and the second image into a merged image based on the superset of image features.

4. The method of claim 3, wherein the merged image is a combined image stitched together from the first image and the second image.

5. The method of claim 3, wherein the merged image is a super-resolution image synthesized from the first image and the second image.

6. The method of claim 1, wherein the first set of image features and the second set of image features for the same location are combined into consensus features.

7. The method of claim 6, further comprising excluding from the superset of image features, features that are determined to be inconsistent with the consensus features.

8. The method of claim 1, further comprising cropping the recognition result based upon the image tracking information indicating the relative locations of the first image and the second image to each other.

9. The method of claim 1, wherein the first image and the second image are from a video stream.

10. A system comprising:
one or more processors; and
a memory coupled with the one or more processors, the memory storing instructions, which when executed, cause the one or more processors to:
  receive a first image and a second image;
  receive image tracking information identifying a position, a rotation, and a scale of the first image relative to the second image, wherein the image tracking information includes sequence and relative timing information for the first image and the second image;
  determine a first set of image features of the first image and a second set of image features of the second image;
  combine the first set of image features and the second set of image features into a superset of image features using the image tracking information including the position, the rotation and the scale of the first image relative to the second image;
  form a single image query corresponding to the first image and the second image based on the superset of image features;
  submit the single image query corresponding to the first image and the second image; and
  receive a recognition result matching the single image query.

11. The system of claim 10, wherein the instructions further cause the one or more processors to:
combine the first image and the second image into a merged image based on the superset of image features.

12. The system of claim 11, wherein the merged image is a combined image stitched together from the first image and the second image.

13. The system of claim 11, wherein the merged image is a super-resolution image synthesized from the first image and the second image.

14. A computer program product comprising a non-transitory computer useable medium including a computer readable program, wherein the computer readable program, when executed on a computer, causes the computer to:
receive a first image and a second image;
receive image tracking information identifying a position, a rotation, and a scale of the first image relative to the second image, wherein the image tracking information includes sequence and relative timing information for the first image and the second image;
determine a first set of image features of the first image and a second set of image features of the second image;
combine the first set of image features and the second set of image features into a superset of image features using the image tracking information including the position, the rotation and the scale of the first image relative to the second image;
form a single image query corresponding to the first image and the second image based on the superset of image features;
submit the single image query corresponding to the first image and the second image; and
receive a recognition result matching the single image query.

15. The computer program product of claim 14, wherein the computer readable program further causes the computer to:
combine the first image and the second image into a merged image based on the superset of image features.

16. The computer program product of claim 15, wherein the merged image is a combined image stitched together from the first image and the second image.

* * * * *